(12) United States Patent
Kim et al.

(10) Patent No.: US 11,762,433 B2
(45) Date of Patent: Sep. 19, 2023

(54) HINGE MODULE AND FOLDABLE ELECTRONIC DEVICE INCLUDING THE SAME

(71) Applicant: Samsung Electronics Co., Ltd., Gyeonggi-do (KR)

(72) Inventors: Jungjin Kim, Gyeonggi-do (KR); Jongyoon Kim, Gyeonggi-do (KR); Chungkeun Yoo, Gyeonggi-do (KR); Jongmin Kang, Gyeonggi-do (KR); Suman Lee, Gyeonggi-do (KR); Sungkyu Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/117,629

(22) Filed: Mar. 6, 2023

(65) Prior Publication Data
US 2023/0205281 A1    Jun. 29, 2023

Related U.S. Application Data

(63) Continuation of application No. 17/399,189, filed on Aug. 11, 2021, now Pat. No. 11,614,780, which is a (Continued)

(30) Foreign Application Priority Data

Feb. 19, 2019    (KR) .......................... 10-2019-0019576

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1641* (2013.01); *H04M 1/0216* (2013.01)

(58) Field of Classification Search
CPC ..................................................... G06F 1/1681
See application file for complete search history.

(56) References Cited

U.S. PATENT DOCUMENTS

| 8,205,305 B2 | 6/2012 | Wang et al. |
| 8,493,730 B2 | 7/2013 | Shim et al. |
| (Continued) | | |

FOREIGN PATENT DOCUMENTS

| CN | 201781516 U | 3/2011 |
| CN | 106205384 A | 12/2016 |
| (Continued) | | |

OTHER PUBLICATIONS

Chinese Office Action dated May 11, 2023.
(Continued)

*Primary Examiner* — Jerry Wu
(74) *Attorney, Agent, or Firm* — Cha & Reiter, LLC

(57) ABSTRACT

A hinge module according to one embodiment includes a fixed structure including a central portion, a guide portion having an edge facing an edge of the central portion, and a support portion configured to connect the central portion and the guide portion, wherein an interior space is formed between the central portion and the guide portion, a connecting shaft extending into the interior space through the central portion and including a gear formed on at least a part of an outer circumferential surface of the connecting shaft, and a rotary structure disposed in the interior space, the rotary structure including a circular arc shaped gear having a plurality of gear teeth arranged in a circular arc shape and that are engaged with the gear, wherein the rotary structure rotates about a virtual axis of rotation passing through a center of a circular arc of the circular arc shaped gear.

25 Claims, 25 Drawing Sheets

Related U.S. Application Data continuation of application No. 16/792,424, filed on Feb. 17, 2020, now Pat. No. 11,537,173.

(56) References Cited

U.S. PATENT DOCUMENTS

| | | | |
|---|---|---|---|
| 8,804,349 B2 | 8/2014 | Lee et al. | |
| 8,938,856 B1 | 1/2015 | Shin et al. | |
| 9,071,673 B2 | 6/2015 | Choi et al. | |
| 9,204,565 B1 | 12/2015 | Lee et al. | |
| 9,274,552 B2 | 3/2016 | Ahn et al. | |
| 9,557,771 B2 | 1/2017 | Park et al. | |
| 9,760,126 B2 | 9/2017 | Shin et al. | |
| 9,801,290 B2 | 10/2017 | Ahn | |
| 9,983,424 B2 | 5/2018 | Kim et al. | |
| 10,001,815 B1* | 6/2018 | Yao | H05K 5/0234 |
| 10,036,188 B1* | 7/2018 | Yao | G06F 1/1681 |
| 10,129,991 B2 | 11/2018 | Lin et al. | |
| 10,386,894 B2 | 8/2019 | Hsu | |
| 10,495,941 B2 | 12/2019 | Hashimoto et al. | |
| 10,627,867 B2 | 4/2020 | Cheng et al. | |
| 2011/0063783 A1 | 3/2011 | Shim et al. | |
| 2011/0271486 A1 | 11/2011 | Wang et al. | |
| 2012/0147535 A1 | 6/2012 | Ahn et al. | |
| 2012/0264489 A1 | 10/2012 | Choi et al. | |
| 2014/0111954 A1 | 4/2014 | Lee et al. | |
| 2014/0123436 A1 | 5/2014 | Griffin et al. | |
| 2014/0196254 A1 | 7/2014 | Song | |
| 2015/0013107 A1 | 1/2015 | Shin et al. | |
| 2015/0366089 A1 | 12/2015 | Park et al. | |
| 2016/0070306 A1 | 3/2016 | Shin et al. | |
| 2016/0097227 A1 | 4/2016 | Hsu | |
| 2016/0205792 A1 | 7/2016 | Ahn | |
| 2018/0192528 A1 | 7/2018 | Lin et al. | |
| 2018/0213663 A1 | 7/2018 | Lin | |
| 2018/0324964 A1 | 11/2018 | Yoo et al. | |
| 2018/0335679 A1 | 11/2018 | Hashimoto et al. | |
| 2019/0032380 A1 | 1/2019 | Wu et al. | |
| 2019/0166703 A1 | 5/2019 | Kim et al. | |
| 2019/0179373 A1 | 6/2019 | Cheng et al. | |
| 2020/0137908 A1 | 4/2020 | Yoo et al. | |
| 2020/0396852 A1 | 12/2020 | Yoo et al. | |
| 2021/0181809 A1 | 6/2021 | Zhang | |
| 2021/0298186 A1 | 9/2021 | Yoo et al. | |

FOREIGN PATENT DOCUMENTS

| | | |
|---|---|---|
| CN | 106252378 A | 12/2016 |
| CN | 205847346 U | 12/2016 |
| CN | 205858944 U | 1/2017 |
| CN | 106415432 A | 2/2017 |
| CN | 106878496 A | 6/2017 |
| CN | 207018340 U | 2/2018 |
| CN | 108076171 A | 5/2018 |
| CN | 109270987 A | 1/2019 |
| EP | 2 219 279 A1 | 2/2009 |
| EP | 3467325 A1 | 4/2019 |
| KR | 10-2012-0064585 A | 6/2012 |
| KR | 10-2016-0114028 A | 10/2016 |
| KR | 10-2019-0062107 A | 6/2019 |
| RU | 105061 U1 | 5/2011 |
| RU | 2683290 C2 | 3/2019 |
| WO | 2016/140524 A1 | 9/2016 |
| WO | 2018/213687 A2 | 11/2018 |

OTHER PUBLICATIONS

The Synchronous Unfolding and Folding Control Technology Based on the Multiple Electric Cylinders for Large Scale Folding Split Screen Jan. 2018, vol. 46 No. 2.

* cited by examiner

HINGE MODULE AND FOLDABLE ELECTRONIC DEVICE INCLUDING THE SAME

CROSS-REFERENCE TO RELATED APPLICATION(S)

This application is a Continuation of U.S. patent application Ser. No. 17/399,189, filed on Aug. 11, 2021, which is a Continuation of U.S. patent application Ser. No. 16/792,424, filed on Feb. 17, 2020 and assigned U.S. Pat. No. 11,537,173 issued on Dec. 27, 2022 which is based on and claims priority under 35 U. S.C. § 119 to Korean Patent Application No. 10-2019-0019576, filed on Feb. 19, 2019, in the Korean Intellectual Property Office, the disclosure of which is incorporated by reference herein its entirety.

BACKGROUND

1. Field

One or more embodiments of the instant disclosure generally relate to a hinge module and a foldable electronic device including the same.

2. Description of Related Art

Certain portable electronic devices may provide a variety of functions via a variety of applications. For example, certain types of the portable electronic devices may provide functions such as data and voice communication, photo or video capture with a camera, Internet communication, multimedia playback and output on a display, etc. Recently, these portable electronic devices may also be used for gaming.

One type of portable electronic devices is a folder type. This type includes two housings connected to rotate relative to each other. The display of the device is disposed on only one of the housings, and the other housing includes the input device, such as a keypad, with which the user inputs commands. This folder type electronic device may be unfolded when in use and may be folded to be easily stowed away when not in use. However, the display of this folder type electronic device may be relatively small because the display is contained in only the one housing.

In recent years, another type of foldable electronic device has been developed to include a flexible display, which, like the folder type, can be easily folded and stowed away when not in use. But unlike the folder type, the foldable display may be disposed on both housings, allowing the display to increase in size. The foldable electronic device may include a display disposed on two housings connected to rotate relative to each other. The flexible display may include a partial area that can be deformed into a curved surface or a flat surface. The two housings may be unfolded to provide a large screen to the user when the foldable electronic device is used, and may be folded to provide portability when the foldable electronic device is not used.

The above information is presented as background information only to assist with an understanding of the disclosure. No determination has been made, and no assertion is made, as to whether any of the above might be applicable as prior art with regard to the disclosure.

SUMMARY

A hinge module may be used for the foldable electronic device, and may include a fixed structure fixedly coupled to a housing, and rotary structures that rotate relative to the fixed structure. The rotary structures may be disposed on opposite sides of the fixed structure with respect to a connecting shaft. However, when an impact is applied to the electronic device including the hinge module, for example when the electronic device is dropped, the rotary structures may be separated from the housing. Furthermore, the hinge module may additionally include a separate elastic member that applies a coupling force to the rotary structures and the fixed structure in the direction of the connecting shaft. Due to this, the number of components of the hinge module is relatively large, and therefore the assembly process for the hinge module may be complicated.

Aspects of the disclosure are to address at least the above-mentioned problems and/or disadvantages and to provide at least the advantages described below. Accordingly, an aspect of the disclosure is to provide a hinge module including a structure capable of maintaining a coupling of a rotary structure and a fixed structure even when an external impact is applied, and an electronic device including the hinge module.

The problems to be solved by the disclosure are not limited to the aforementioned problems, and any other problems not mentioned herein will be clearly understood from the following description by those skilled in the art to which the disclosure pertains.

In accordance with an aspect of the disclosure, a hinge module includes a first fixed structure that includes a first central portion, a first support portion extending from the first central portion in a first direction, and a first guide portion extending from the first support portion in a third direction perpendicular to the first direction, a second fixed structure that includes a second central portion coupled to one side of the first central portion that faces a second direction opposite to the first direction, a second support portion extending from the second central portion in the second direction, and a second guide portion extending from the second support portion in a fourth direction perpendicular to the second direction, the second fixed structure being integrally or removably coupled to the first fixed structure, a first connecting shaft that includes a first gear formed on at least a part of an outer circumferential surface thereof and extends in the first direction and that passes through at least a part of the first central portion of the first fixed structure such that at least a part of the first gear is disposed between the first central portion and the first guide portion, a first rotary structure that is disposed between the first guide portion and the first central portion and that includes a first circular arc shaped gear engaged with the first gear, the first rotary structure being coupled with the first connecting shaft so as to be rotated about a first virtual axis of rotation passing through a center of a circular arc of the first circular arc shaped gear, a second connecting shaft that includes a second gear formed on at least a part of an outer circumferential surface thereof and extends in the second direction and that passes through at least a part of the second central portion of the second fixed structure such that at least a part of the second gear is disposed between the second central portion and the second guide portion, the first connecting shaft and the second connecting shaft being linked with each other so as to be rotated in opposite directions, and a second rotary structure that is disposed between the second guide portion and the second central portion and that includes a second circular arc shaped gear engaged with the second gear, the second rotary structure being configured to be rotated about a second virtual axis of rotation passing through a center of a circular arc of the second circular arc shaped gear, by rotation of the second connecting shaft.

In accordance with another aspect of the disclosure, a hinge module includes a fixed structure that includes a central portion, a guide portion having an edge facing an edge of the central portion, and a support portion that connects the central portion and the guide portion, an interior space being formed between the central portion and the guide portion, a connecting shaft extending into the interior space through the central portion and including a gear formed on at least a part of an outer circumferential surface of the connecting shaft, and a rotary structure that is disposed in the interior space and that includes a circular arc shaped gear that includes a plurality of gear teeth arranged in a circular arc shape and that are engaged with the gear, in which the rotary structure rotates about a virtual axis of rotation passing through a center of a circular arc of the circular arc shaped gear.

In accordance with another aspect of the disclosure, an electronic device includes a housing structure that includes a first housing, a second housing, and a hinge housing disposed between the first housing and the second housing, a flexible display that is disposed on the housing structure so as to extend from the first housing to the second housing and that includes a first area formed of a flat surface of the first housing, a second area formed of a flat surface of the second housing, and a folding area formed between the first area and the second area and configured to be folded to be flat or curved, and a hinge module that is disposed in the hinge housing and that rotates the first housing about a first virtual axis of rotation extending in a first direction and rotates the second housing about a second virtual axis of rotation parallel to the first virtual axis of rotation. The hinge module includes a fixed structure that is fixedly disposed in the hinge housing and that includes a central portion, a first support portion extending from the central portion in the first direction, a first guide portion extending from the first support portion in a third direction perpendicular to the first direction, a second support portion extending from the central portion in a second direction opposite to the first direction, and a second guide portion extending from the second support portion in a fourth direction perpendicular to the second direction, a first rotary structure disposed between the first guide portion and the central portion and connected with the first housing, and a second rotary structure disposed between the second guide portion and the central portion and connected with the second housing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
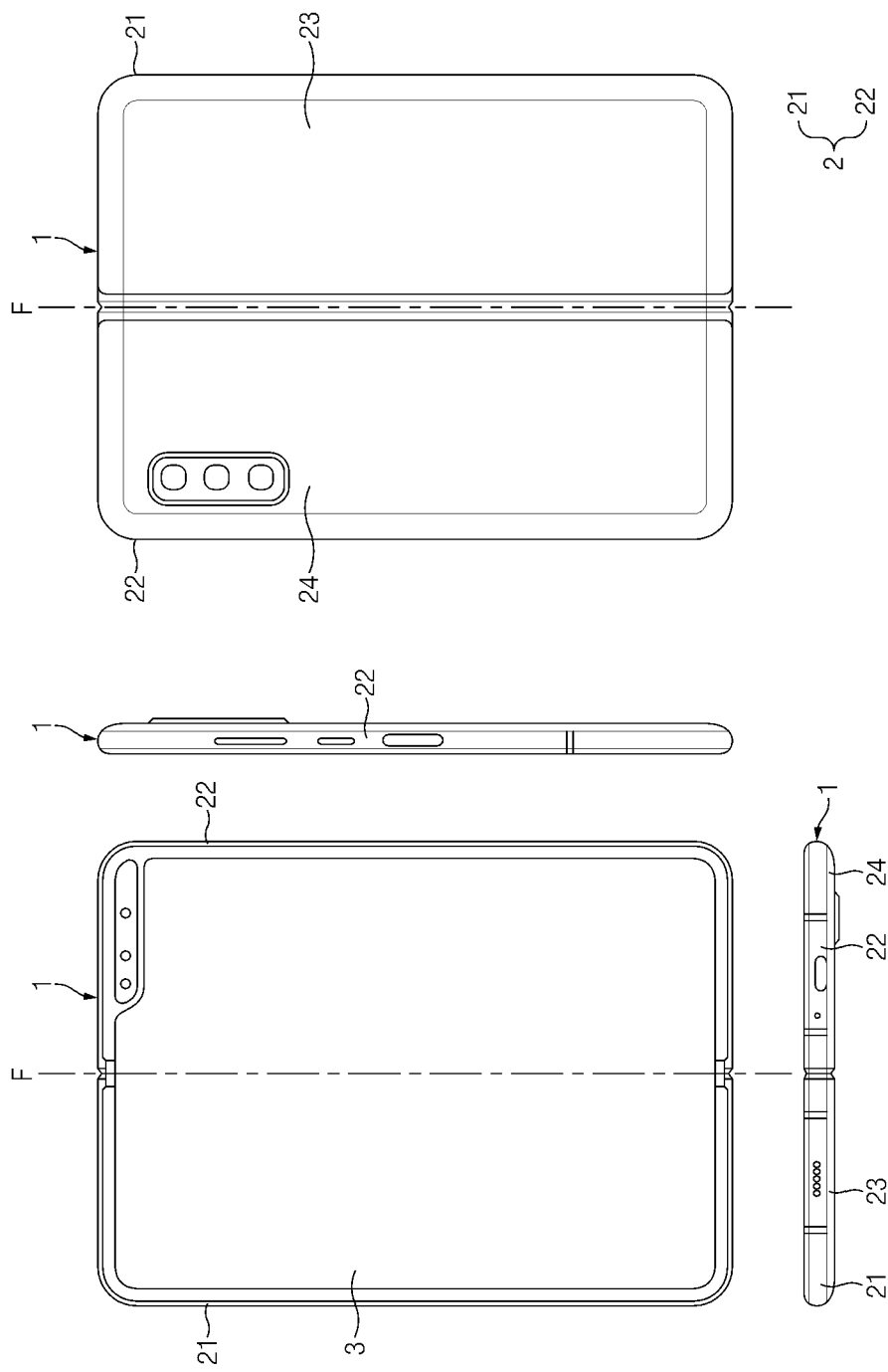
FIG. 1 is views illustrating a flat state of a foldable electronic device according to an embodiment.
Figure 2:
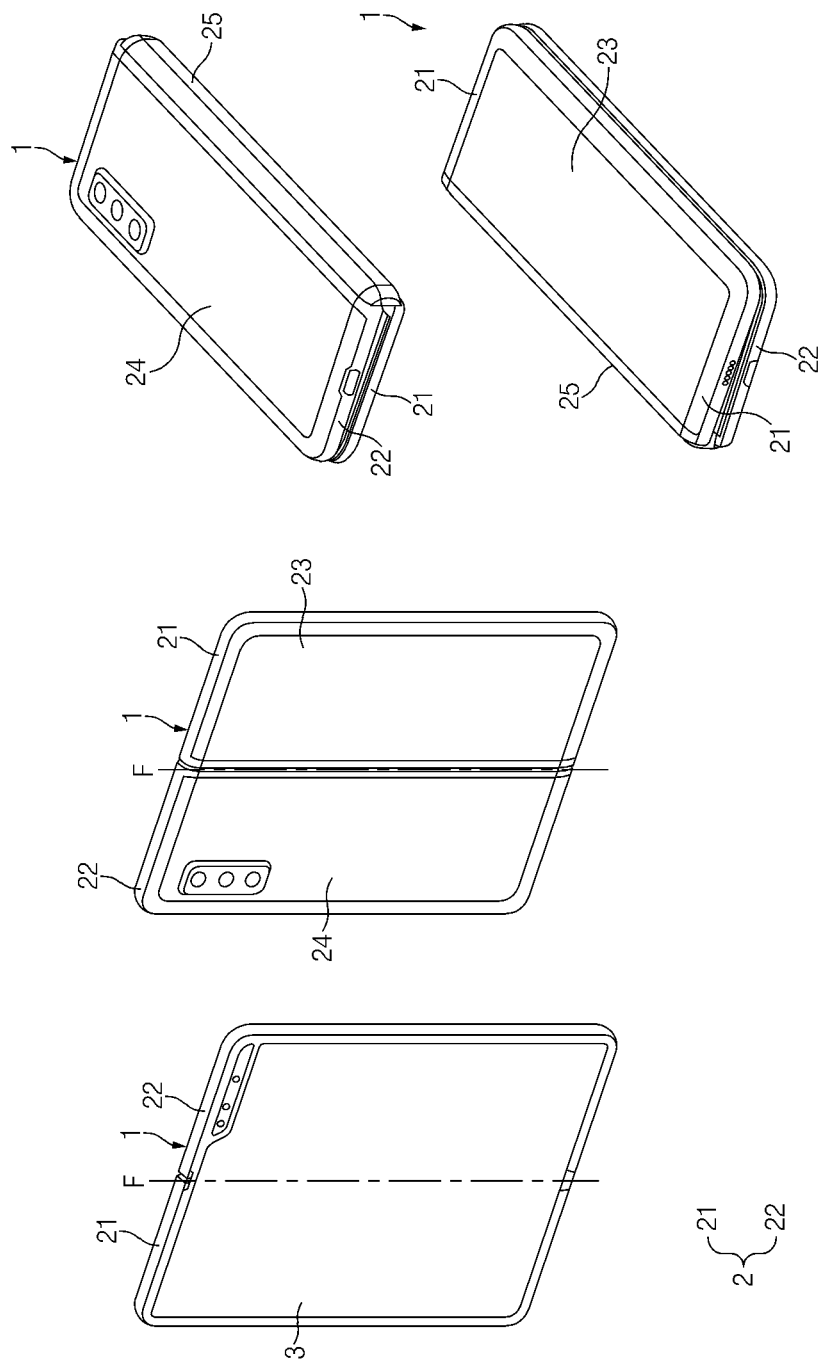
FIG. 2 is perspective views illustrating a flat state and a folded state of the foldable electronic device according to an embodiment.

FIG. 1 is views illustrating a flat state of a foldable electronic device according to an embodiment. FIG. 2 is perspective views illustrating a flat state and a folded state of the foldable electronic device according to an embodiment.

As illustrated in FIGS. 1 and 2, the foldable electronic device 1 including a flexible display 3 according to an embodiment of the disclosure may include a first housing 21, a second housing 22, a first cover 23, a second cover 24, and a hinge housing 25.

Hereinafter, the flat state may refer to the state in which the electronic device 1 is fully unfolded so that the first housing 21 and the second housing 22 form an angle of 180 degrees therebetween, and the folded state may refer to the state in which the electronic device 1 is fully folded so that the first housing 21 and the second housing 22 form an angle of approximately 0 degrees therebetween. In the folded state, at least a portion of the first housing 21 may be in contact with at least a portion of the second housing 22.

In an embodiment, the first housing 21 and the second housing 22 may be connected with each other to form the body of the electronic device 1. The first housing 21 and the second housing 22 may be connected so as to be rotatable relative to each other. When the electronic device 1 is in the flat state, the front side of the first housing 21 and the front side of the second housing 22 may form one plane, and when the electronic device 1 is in the folded state, the front side of the first housing 21 and the front side of the second housing 22 may face each other.

In an embodiment, the first housing 21 and the second housing 22 may be manufactured by injection molding a synthetic resin, or may be made of metals such as stainless steel (STS), aluminum (Al), or titanium (Ti). However, the instant disclosure is not so limited, and the first housing 21 and the second housing 22 may be made of various other materials. Thus, parts of the first housing 21 and the second housing 22 may be made of various metallic or non-metallic materials and may have various stiffness characteristics to support the flexible display 3.

In an embodiment, part of the flexible display 3 may be disposed on at least part of the front side of the first housing 21, and the remaining part of the flexible display 3 may be disposed on at least part of the front side of the second housing 22. That is, the flexible display 3 may be formed over at least one side of the first housing 21 and at least one side of the second housing 22 and is capable of deformation. The first housing 21 and the second housing 22 may have a separate space therein in which to accommodate electronic elements, such as a printed circuit board (e.g., a printed circuit board 6 of FIG. 3) and a battery (not illustrated). These electronic elements are required to drive the flexible display 3. The first cover 23 may be assembled on a rear side of the first housing 21, and the second cover 24 may be assembled on a rear side of the second housing 22. Accordingly, the first cover 23 and the second cover 24 may prevent the electronic elements from being exposed to the outside of the device, and prevent infiltration of foreign matter, such as dust or moisture, into the electronic elements, and prevent damage to the electronic elements due to friction or impact.

In an embodiment, the hinge housing 25 may be disposed between the first housing 21 and the second housing 22. The hinge housing 25 may cover the outside of a hinge assembly (e.g., a hinge assembly 4 of FIG. 3) that connects the first housing 21 and the second housing 22, and may protect the hinge assembly. As illustrated in FIG. 2, when the electronic device 1 is in the flat state, the hinge housing 25 may be substantially covered by the first cover 23 and the second cover 24 so as not to be exposed to the outside. In contrast, when the electronic device 1 is in the folded state, at least part of the hinge housing 25 may be exposed to the outside from between a lateral portion of the first housing 21 and a lateral portion of the second housing 22.

As the electronic device 1 is unfolded to the flat state, the space between the lateral portion of the first housing 21 and the lateral portion of the second housing 22 may become gradually narrower. Further, opposite sides of the hinge housing 25 may be inserted into the first housing 21 and the second housing 22. When the electronic device 1 is in the fully flat state, the hinge housing 25 may be covered by the first cover 23 and the second cover 24 and may not be exposed to the outside. As the electronic device 1 is folded to the folded state, the space between the lateral portion of the first housing 21 and the lateral portion of the second housing 22 may become gradually wider. The opposite sides of the hinge housing 25 may be gradually exposed by the first housing 21 and the second housing 22. When the electronic device 1 is in the fully folded state, at least part of the hinge housing 25 may be exposed. However, even in this case, the first cover 23 and the second cover 24 may cover some remaining portions of the hinge housing 25 (e.g. the lateral edges of the hinge housing 25).

In an embodiment, the electronic device 1 may include a waterproof member (not illustrated) to prevent infiltration of foreign matter, such as dust or moisture, into the first housing 21 and the second housing 22. The waterproof member may be formed between the flexible display 3, and the first housing 21 and the second housing 22 or between the first housing 21 and the second housing 22 so that it fills clearances or gaps that are generated during assembly thereof, thereby sealing the interior space of the housings.

In an embodiment, the flexible display 3 may display (output) information processed in the electronic device 1. For example, the flexible display 3 may display execution screen information of an application program running in the electronic device 1, which may include a user interface (UI) or a graphic user interface (GUI). The flexible display 3 according to certain disclosed embodiments of the disclosure may be deformed by an external force. The deformation may be at least one of curving, bending, folding, twisting, or rolling of the flexible display 3.

In an embodiment, the display area of the flexible display 3 may be a flat surface when no external force is applied to the flexible display 3. That is, without deformation, the flexible display 3 may have an infinite radius of curvature. On the other hand, the display area of the flexible display 3 may be a curved surface when an external force is applied to the flexible display 3. That is, when deformed, at least part of the flexible display 3 may have a finite radius of curvature. Information may be displayed on the curved surface. Lighting of sub-pixels arranged in a matrix form may be independently controlled to display the visual information. The sub-pixel may be referring to the minimum unit for implementing a color. For example, a pixel may include 3 sub-pixels for implementing red, green, and blue.

Figure 3:
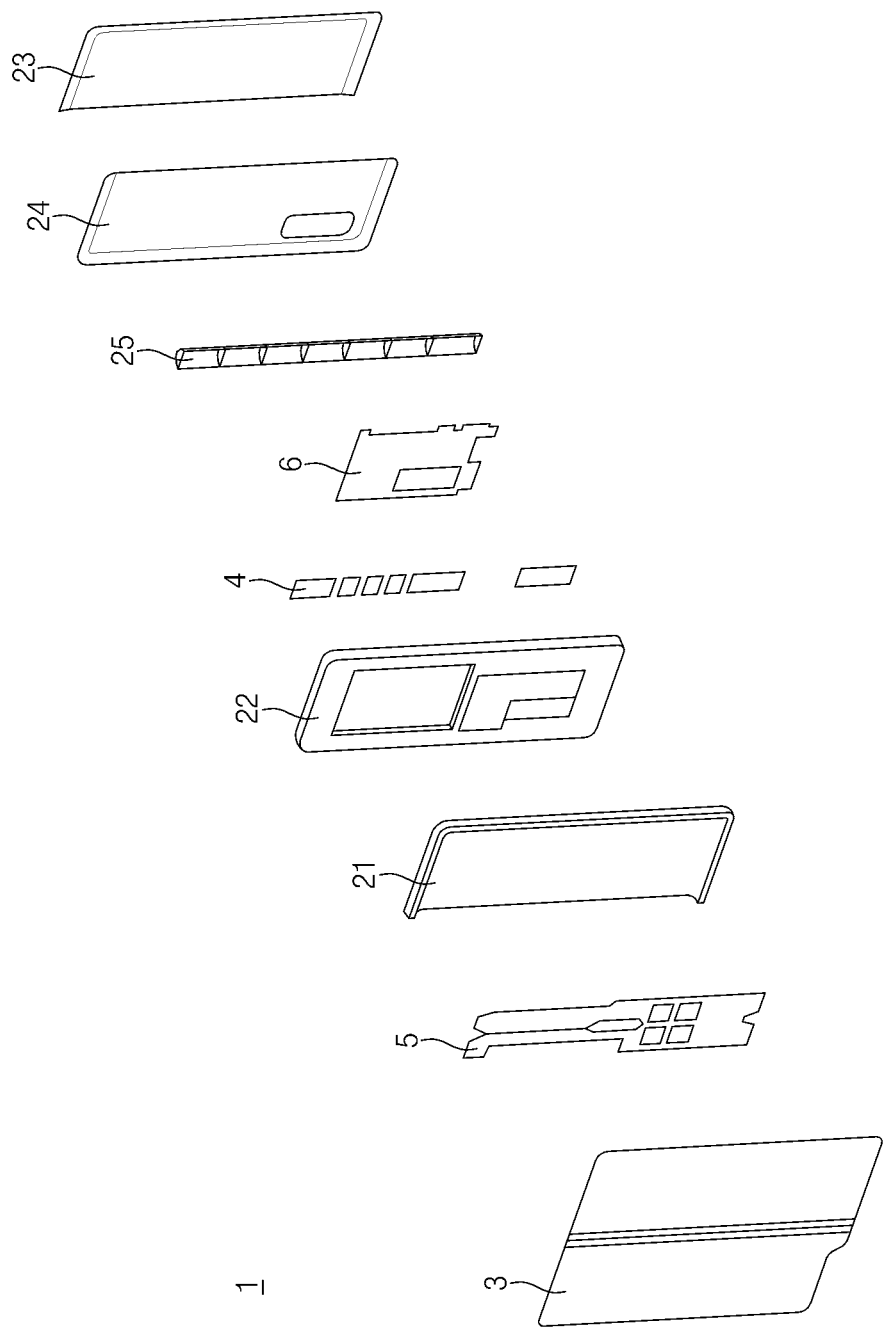
FIG. 3 is an exploded perspective view of the electronic device according to an embodiment.

FIG. 3 is an exploded perspective view of the electronic device according to an embodiment.

As illustrated in FIG. 3, the electronic device 1 according to an embodiment of the disclosure may further include the hinge assembly 4, a hinge plate 5, and the printed circuit board 6.

In an embodiment, the hinge assembly 4 may couple the first housing 21 and the second housing 22 together to allow the first housing 21 and the second housing 22 to rotate relative to each other. The first housing 21 and the second housing 22 may preferably have shapes of the same size and are symmetric to each other with respect to an axis of symmetry F (refer to FIG. 2). Further, the hinge assembly 4 may be connected to adjacent edges of the first housing 21 and the second housing 22. Then, the first housing 21 and the second housing 22 may rotate about the hinge assembly 4.

In an embodiment, the hinge assembly 4 may include a plurality of hinge modules. The hinge modules may include a gear hinge module (e.g., 40 of FIG. 5) that uses a gear and a gearless hinge module (e.g., 400 of FIG. 5) that uses no gear. The gear hinge module 40 may rotate the first hinge housing 21 and the second housing 22 using the gear. Accordingly, even though a rotational force is applied to only one of the first housing 21 and the second housing 22, the other housing may symmetrically rotate together. That is, the first housing 21 and the second housing 22 may rotate in mutual dependence on each other. In contrast, the gearless hinge module 400 may not include a gear therein and may include only a rotation guide structure. Accordingly, the gearless hinge module 400 may reduce noise generated by the rotation of the housings 21 and 22.

In an embodiment, the printed circuit board 6 may be disposed between the first cover 23 and the first housing 21 or between the second cover 24 and the second housing 22. Alternatively, when a plurality of printed circuit boards 6 are provided, the printed circuit boards 6 may be disposed between the first cover 23 and the first housing 21 and between the second cover 24 and the second housing 22. Electronic elements required to drive the electronic device 1 may be mounted on the printed circuit board 6. For example, processor, memory, communication circuit, antenna, microphone, speaker, and/or camera may be mounted on the printed circuit board 6.

The electronic device 1 according to certain embodiments may further include a battery (not illustrated). The battery may produce electric power and may supply the electric power to the inside of the electronic device 1. The battery may be disposed between the first cover 23 and the first housing 21 or between the second cover 24 and the second housing 22.

Figure 4:
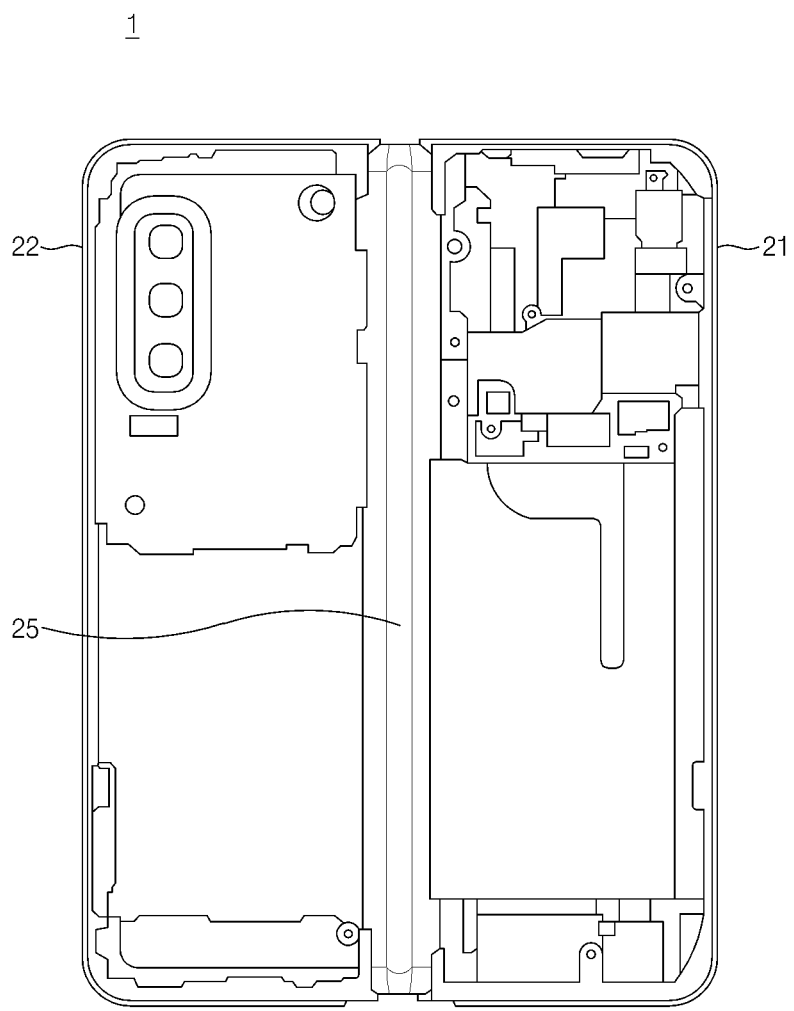
FIG. 4 is a view illustrating the interior of the electronic device according to an embodiment.

FIG. 4 is a view illustrating the interior of the electronic device according to an embodiment.

The hinge housing 25 may be disposed between the first housing 21 and the second housing 22. Further, as illustrated in FIG. 4, when the first cover 23 and the second cover 24 are removed, the opposite sides of the hinge housing 25 may be disposed on the first housing 21 and the second housing 22, respectively. Accordingly, if the first cover 23 and the second cover 24 are assembled, and when the electronic device 1 is unfolded, the opposite sides of the hinge housing 25 may be inserted between the first cover 23 and the first housing 21 and between the second cover 24 and the second housing 22.

In an embodiment, the first housing 21 and the second housing 22 may have the separate space therein. Accordingly, as illustrated in FIG. 4, the electronic elements required to drive the flexible display 3 may be disposed in the separate space.

Figure 5:
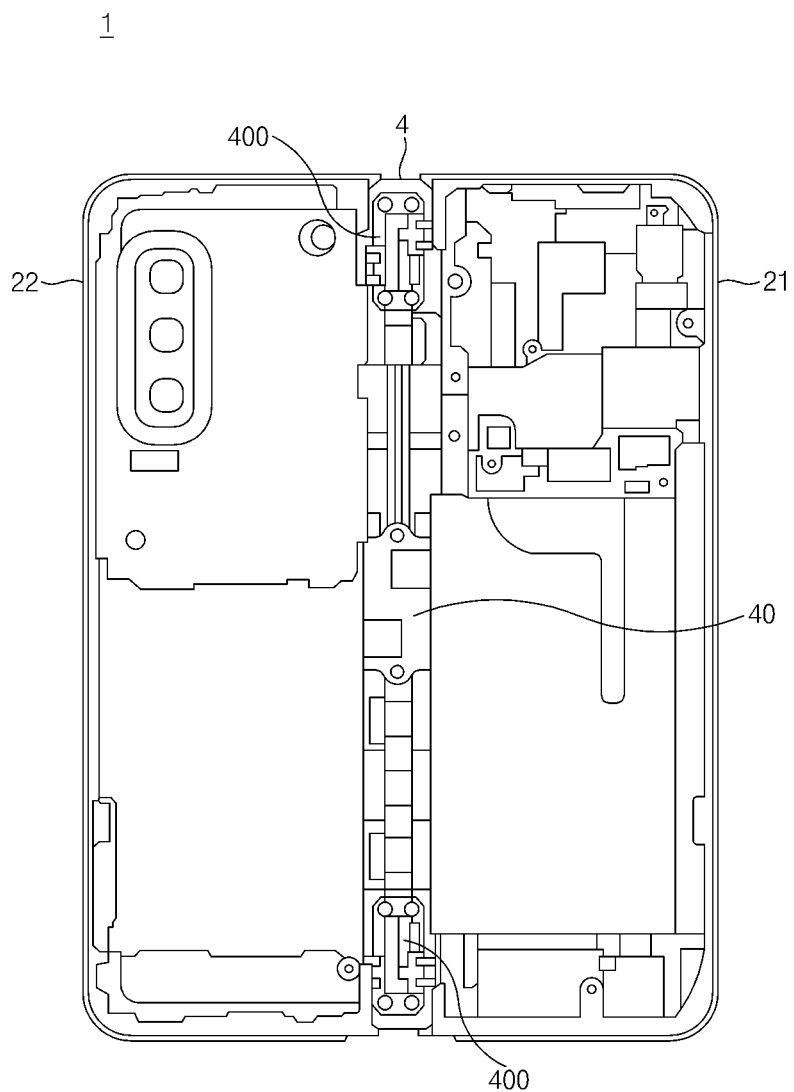
FIG. 5 is a view illustrating the interior of a hinge housing of the electronic device according to an embodiment.

FIG. 5 is a view illustrating the interior of the hinge housing of the electronic device according to an embodiment.

In an embodiment, the hinge housing 25 may cover the outside of the hinge assembly 4 and may protect the hinge assembly 4. Accordingly, as illustrated in FIG. 5, when the hinge housing 25 is removed, the hinge assembly 4 is shown as being disposed between the first housing 21 and the second housing 22 to connect the first housing 21 and the second housing 22.

In an embodiment, the gear hinge module 40 may link the rotational motions of the first housing 21 and the second housing 22. The first housing 21 and the second housing 22 may be configured to be parallel to each other about axis F (see FIG. 2), but may rotate about different axes of rotation. When the first housing 21 and the second housing 22 rotate independently without being linked with each other, slip may occur between the first housing 21 and the second housing 22 even when the electronic device 1 is folded. Accordingly, the electronic device 1 according to an embodiment of the disclosure may include at least one gear hinge module 40.

In an embodiment, to reduce noise generated between gears, the electronic device 1 may include one gear hinge module 40 and a plurality of gearless hinge modules 400. For example, as illustrated in FIG. 5, the gear hinge module 40 may be disposed at the center of the hinge housing 25, and the gearless hinge modules 400 may be disposed on opposite sides of the hinge housing 25.

In an embodiment, the hinge assembly (e.g., the hinge assembly 4 of FIG. 3) may preferably include a plurality of hinge modules to allow the first housing 21 and the second housing 22 to be stably rotated. The hinge assembly 4 of the electronic device 1 disclosed herein may include various hinge modules without being limited to the configuration illustrated in FIG. 5. Hereinafter in the examples below, the hinge module disclosed herein may include the gear hinge module 40.

Figure 6:
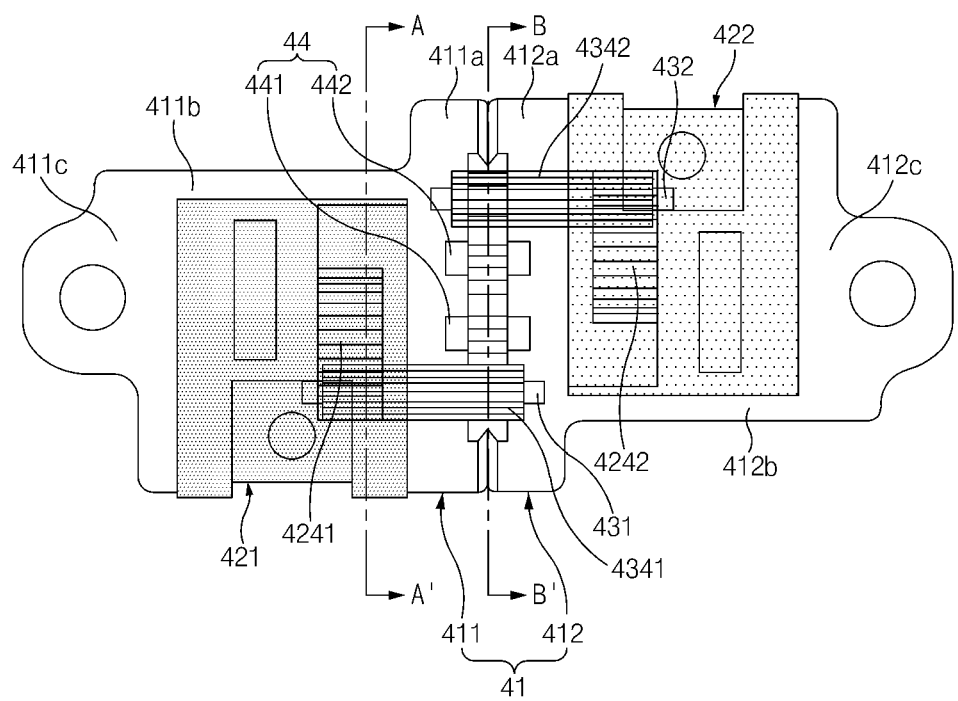
FIG. 6 is a transparent view of a hinge module according to an embodiment.
Figure 6:
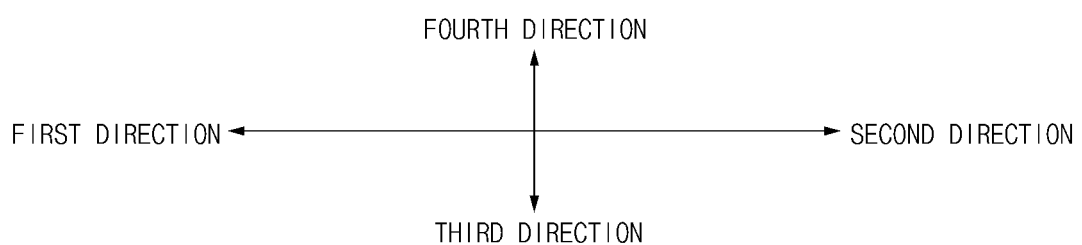

FIG. 6 is a transparent view of the hinge module according to an embodiment.

In the illustrated embodiment, the hinge module 40 may include a fixed structure 41, a first connecting shaft 431 and a second connecting shaft 432 that pass through portions of the fixed structure 41, and a first rotary structure 421 and a second rotary structure 422 that are coupled to the fixed structure 41.

In the illustrated embodiment, the fixed structure 41 may include central portions 411a and 412a, a first support portion 411b extending from the central portion 411a in a first direction, a second support portion 412b extending from the central portion 412a in a second direction opposite to the first direction, a first guide portion 411c extending from the first support portion 411b in a third direction perpendicular to the first direction, and a second guide portion 412c extending from the second support portion 412b in a fourth direction opposite to the third direction.

In the illustrated embodiment, the first guide portion 411c may have an edge facing an edge of the central portion 411a. This creates a space to accommodate first rotary structure 421 which may be disposed between the first guide portion 411c and the central portion 411a. The first support portion 411b, together with the first guide portion 411c and the central portion 411a, may surround at least part of the first rotary structure 421.

In the illustrated embodiment, the second guide portion 412c may have an edge facing an edge of the central portion 412a. This creates a space to accommodate second rotary structure 422 which may be disposed between the second guide portion 412c and the central portion 412a. The second support portion 412b, together with the second guide portion 412c and the central portion 412a, may surround at least part of the second rotary structure 422.

In the illustrated embodiment, the fixed structure 41 may include a first fixed structure 411 that includes the central portion 411a, the first guide portion 411c, and the first support portion 411b. The fixed structure 41 also may include a second fixed structure 412 that includes the central portion 412a, the second guide portion 412c, and the second support portion 412b.

In the illustrated embodiment, the central portions 411a and 412a may include sub-gears 44 configured to link a first gear 4341 included in the first connecting shaft 431 and a second gear 4342 included in the second connecting shaft 432. The sub-gears 44 may be disposed between the first fixed structure 411 and the second fixed structure 412. An even number of sub-gears 44 may be provided to allow the first connecting shaft 431 and the second connecting shaft 432 to rotate in opposite directions.

In the illustrated embodiment, at least part of the first connecting shaft 431 may be disposed to overlap the central portion 412a of the fixed structure 41. The first connecting shaft 431 may pass through the central portion 411a of the fixed structure 41 such that the remaining part of the first connecting shaft 431 extends between the first guide portion 411c and the central portion 411a. The first connecting shaft 431 may have the first gear 4341 formed on at least part of the outer circumferential surface thereof. The first connecting shaft 431 may pass through the central portion 411a such that at least a portion of the first gear 4341 is located between the first guide portion 411c and the central portion 411a. The portion of the first gear 4341 between the first guide portion 411c and the central portion 411a may be engaged with a first internal gear 4241 of the first rotary structure 421 disposed in the space between the first guide portion 411c and the central portion 411a.

In the illustrated embodiment, at least part of the second connecting shaft 432 may be disposed to overlap the central portion 411a of the fixed structure 41. The second connecting shaft 432 may pass through the central portion 412a of the fixed structure 41 such that the remaining part of the second connecting shaft 432 extends between the second guide portion 412c and the central portion 412a. The second connecting shaft 432 may have the second gear 4342 formed on at least part of the outer circumferential surface thereof. The second connecting shaft 432 may pass through the central portion 412a such that at least a portion of the second gear 4342 is located between the second guide portion 412c and the central portion 412a. The portion of the second gear 4342 between the second guide portion 412c and the central portion 412a may be engaged with a second internal gear 4242 of the second rotary structure 422 disposed in the space between the second guide portion 412c and the central portion 412a.

In the illustrated embodiment, the first rotary structure 421 may be disposed between the central portion 411a of the fixed structure 41 and the first guide portion 411c. The first rotary structure 421 may make contact with the first guide portion 411c of the fixed structure 41 in the first direction. The first rotary structure 421 may make contact with the central portion 411a of the fixed structure 41 in the second direction. The first rotary structure 421 may make contact with the first support portion 411b of the fixed structure 41 in the fourth direction. The displacement of the first rotary structure 421 may be fixed in the directions of the connecting shafts (the first connecting shaft 431 and the second connecting shaft 432) because the first rotary structure 421 is disposed between the central portion 411a and the first guide portion 411c.

In the illustrated embodiment, the first rotary structure 421 may include the first internal gear 4241. The first internal gear 4241 may be engaged with the first gear 4341 of the first connecting shaft 431. The first internal gear 4241 may be, for example, a gear formed along the inner circumferential surface of an opening formed in the first rotary structure 421. In an embodiment, the first internal gear 4241 may be a circular arc shaped internal gear that includes a plurality of gear teeth arranged in a circular arc shape along the inner circumferential surface of the opening. The central axis of the circular arc may be perpendicular to the third direction and the fourth direction and may be disposed at a position spaced apart from the rotating axis of the first connecting shaft 431.

In the illustrated embodiment, the second rotary structure 422 may be disposed between the central portion 412a of the fixed structure 41 and the second guide portion 412c. The second rotary structure 422 may make contact with the second guide portion 412c of the fixed structure 41 in the second direction. The second rotary structure 422 may make contact with the central portion 412a of the fixed structure 41 in the first direction. The second rotary structure 422 may make contact with the second support portion 412b of the fixed structure 41 in the third direction. The displacement of the second rotary structure 422 may be fixed in the directions of the connecting shafts (the first connecting shaft 431 and the second connecting shaft 432) because the second rotary structure 422 is disposed between the central portion 412a and the second guide portion 412c.

In the illustrated embodiment, the second rotary structure 422 may include the second internal gear 4242. The second internal gear 4242 may be engaged with the second gear 4342 of the second connecting shaft 432. The second internal gear 4242 may be, for example, a gear formed along the inner circumferential surface of an opening formed in the second rotary structure 422. In an embodiment, the second internal gear 4242 may be a circular arc shaped internal gear that includes a plurality of gear teeth arranged in a circular arc shape along the inner circumferential surface of the opening. The central axis of the circular arc may be perpendicular to the third direction and the fourth direction and may be disposed at a position spaced apart from the rotating axis of the second connecting shaft 432.

Hereinafter, the hinge motion of the hinge module illustrated in FIG. 6 will be described with reference to FIGS. 7 to 10.

Figure 7:
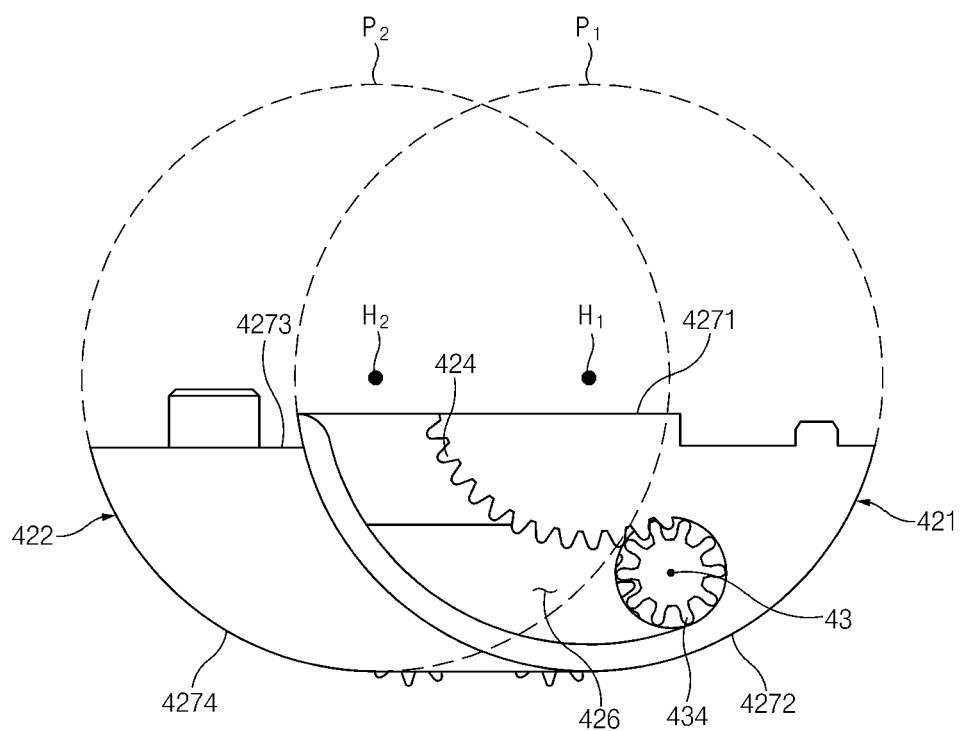
FIG. 7 is a sectional view of the hinge module according to an embodiment.

FIG. 7 is a sectional view of the hinge module according to an embodiment. FIG. 7 is a sectional view taken along line A-A' of FIG. 6.

Referring to FIG. 7, the rotary structures 421 and 422 may include an opening 426 formed therein in a substantially circular arc shape and an internal gear 424 formed on the inner wall of the opening 426. The internal gear 424 (e.g., the first internal gear 4241 or the second internal gear 4242 of FIG. 6) may include a plurality of gear teeth formed on a substantially circular arc surface. The internal gear 424 may be engaged with a gear 434 (e.g., the first gear 4341 or the second gear 4342 of FIG. 7) that is formed on a connecting shaft 43 (e.g., the first connecting shaft 431 or the second connecting shaft 432 of FIG. 6). Rotation of the internal gear 424 may be linked with rotation of the connecting shaft 43. The gear 434 may rotate in a state in which the position thereof is fixed by the connecting shaft 43 disposed in a through-hole, and the rotary structures 421 and 422 may rotate about a first virtual axis of rotation H1 and a second virtual axis of rotation H2, respectively. The first virtual axis of rotation H1 may be an axis passing through the center of the opening 426 of the first rotary structure 421, where the opening 426 has a circular arc shape. The second virtual axis of rotation H2 may be an axis passing through the center of the opening 426 of the second rotary structure 422 and similarly has a circular arc shape.

In an embodiment, the first rotary structure 421 may be rotated about the first virtual axis of rotation H1. The first rotary structure 421 may include a first surface 4271 facing the flexible display (e.g., the flexible display 3 of FIG. 2) in the flat state and a second surface 4272 which is curved and spaced apart from the first virtual axis of rotation H1 by a predetermined distance in the radial direction. For example, the first rotary structure 421 may be substantially semicircular.

In the illustrated embodiment, the first rotary structure 421 may rotate such that the second surface 4272 follows a first path P1 spaced apart from the first virtual axis of rotation H1 at a predetermined interval. In other words, the first path P1 represented by a dotted line in the drawing may be the path of the second surface 4272 of the first rotary structure 421 that rotates about the first virtual axis of rotation H1.

In an embodiment, the internal gear 424 (e.g., the second internal gear 4242 of FIG. 6) that is included in the second rotary structure 422 may be engaged with the gear 434 (e.g., the second gear 4342 of FIG. 6) of the connecting shaft 43 (e.g., the second connecting shaft 432 of FIG. 6), and the second rotary structure 422 may be rotated like the first rotary structure 421. However, the rotational direction of the second rotary structure 422 may be opposite to the rotational direction of the first rotary structure 421. The second rotary structure 422 may be rotated about the second virtual axis of rotation H2. The second rotary structure 422 may include a first surface 4273 facing the flexible display (e.g., the flexible display 3 of FIG. 2) and a second surface 4274 that is curved surface and spaced apart from the second virtual axis of rotation H2 by a predetermined distance in the radial direction. For example, the second rotary structure 422 may also be substantially semicircular.

In the illustrated embodiment, the second rotary structure 422 may rotate such that the second surface 4274 follows a second path P2 spaced apart from the second virtual axis of rotation H2 at a predetermined interval. That is, the second path P2 represented by a dotted line in the drawing may be the path of the second surface 4274 of the second rotary structure 422 that rotates about the second virtual axis of rotation H2.

Figure 8:
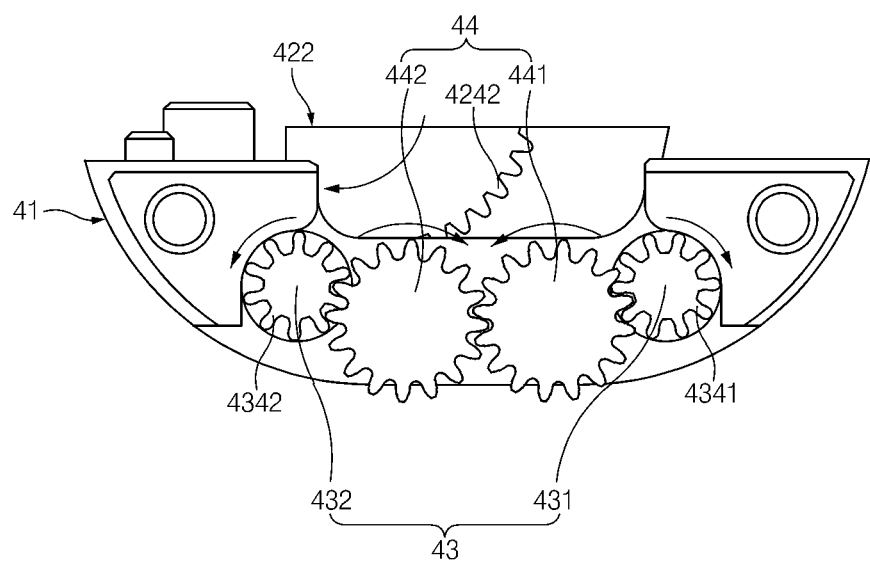
FIG. 8 is a sectional view of the hinge module according to an embodiment.

FIG. 8 is a sectional view of the hinge module according to an embodiment. FIG. 8 is a sectional view taken along line B-B' of FIG. 6.

Referring to FIG. 8, the hinge module 40 may include a plurality of gears. The plurality of gears may include a first internal gear 4241, the first gear 4341 engaged with the first internal gear 4241, a first sub-gear 441 engaged with the first gear 4341, a second sub-gear 442 engaged with the first sub-gear 441, the second gear 4342 engaged with the second sub-gear 442, and the second internal gear 4242 engaged with the second gear 4342. The first connecting shaft 431 and the second connecting shaft 432 may be connected via the sub-gears 44 disposed between the first gear 4341 and the second gear 4342. The first sub-gear 441 may be engaged with the first gear 4341 and the second sub-gear 442. The second sub-gear 442 may be engaged with the first sub-gear 441 and the second gear 4342. An even number of sub-gears 44 may be provided to rotate the first rotary structure 421 and the second rotary structure 422 in opposite directions. For example, when the second rotary structure 422 and the second internal gear 4242 rotates in a first rotational direction (the clockwise direction, when the electronic device 1 is folded into the folded state), the second connecting shaft 432 may rotate in a second rotational direction (the counterclockwise direction), the second sub-gear 442 may rotate in the first rotational direction (the clockwise direction), the first sub-gear 441 may rotate in the second rotational direction (the counterclockwise direction), the first connecting shaft 431 may rotate in the first rotational direction (the clockwise direction), and the first internal gear 4241 and the first rotary structure 421 may rotate in the second rotational direction (the counterclockwise direction). Accordingly, the first rotary structure 421 and the second rotary structure 422 may rotate in the opposite directions.

Figure 9:
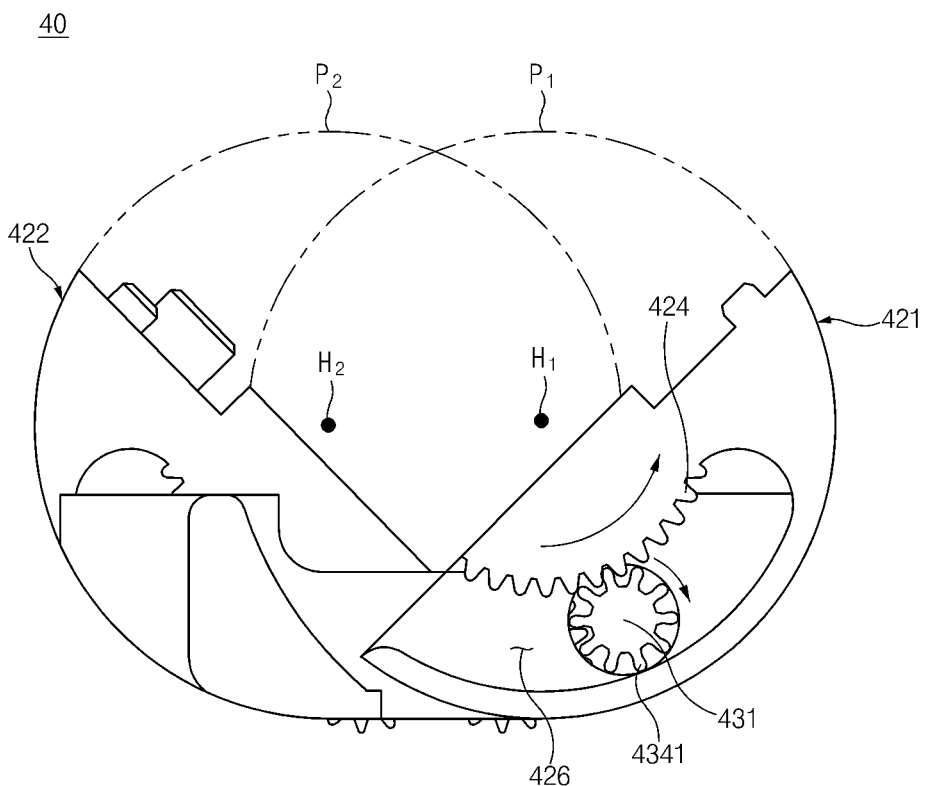
FIG. 9 is a sectional view illustrating a state in which a first rotary structure and a second rotary structure of the hinge module according to an embodiment are rotated to an angle of 45 degrees.
Figure 10:
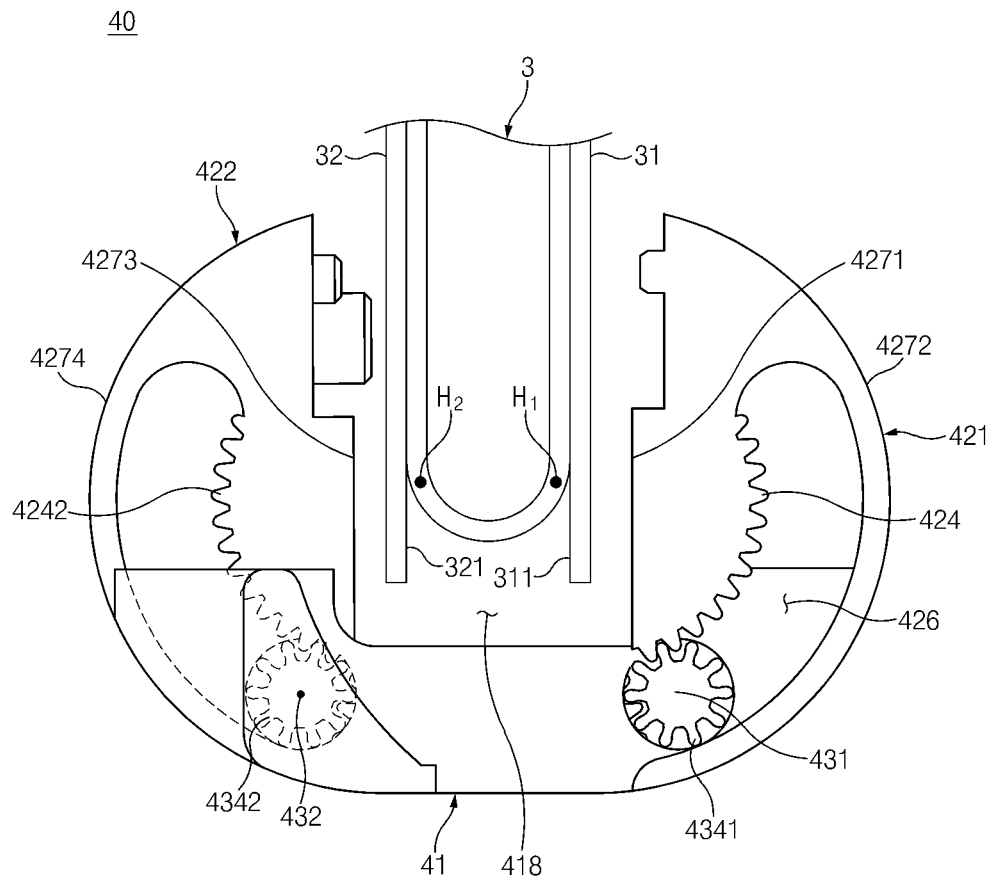
FIG. 10 is a sectional view illustrating a state in which the first rotary structure and the second rotary structure of the hinge module according to an embodiment are rotated to an angle of 90 degrees.

FIG. 9 is a sectional view illustrating a state in which the first rotary structure and the second rotary structure of the hinge module according to an embodiment are rotated to an angle of 45 degrees. FIG. 9 is a sectional view taken along line A-A' of FIG. 6. FIG. 10 is a sectional view illustrating a state in which the first rotary structure and the second rotary structure of the hinge module according to an embodiment are rotated to an angle of 90 degrees. FIG. 10 is a sectional view taken along line A-A' of FIG. 6.

Referring to FIG. 9, the internal gear 424 may be engaged with the first gear 4341 of the first connecting shaft 431, and therefore the first rotary structure 421 may be linked with the first connecting shaft 431 to rotate in the opposite direction to the rotational direction of the first connecting shaft 431. As illustrated in FIG. 8, the second rotary structure 422 may rotate in the opposite direction to the rotational direction of the first rotary structure 421.

Referring to FIG. 9, the first rotary structure 421 may rotate along the path P1 in the counterclockwise direction, and the second rotary structure 422 may rotate along the path P2 in the clockwise direction. At this time, the first connecting shaft 431 including the first gear 4341 engaged with the internal gear 424 of the first rotary structure 421 may rotate in the clockwise direction, and the second connecting shaft 432 including the second gear 4342 engaged with the internal gear 424 of the second rotary structure 422 may rotate in the counterclockwise direction.

Referring to FIG. 10, the first internal gear 4241 may be between the first connecting shaft 431 and the first virtual axis of rotation H1. The first internal gear 4241 may be formed on the inner circumferential surface of the opening 426 that has a circular arc shape. And in the configuration shown in FIG. 10, the first internal gear 4241 may be formed the surface of the opening 426 that is adjacent to the first virtual axis of rotation H1. The second internal gear 4242 may be between the second connecting shaft 432 and the second virtual axis of rotation H2. The second internal gear 4242 may be formed on the inner circumferential surface of the opening 426 that has a circular arc shape. And in the configuration shown in FIG. 10, the first internal gear 4241 may be formed the surface of the opening 426 that is adjacent to the second virtual axis of rotation H2.

Referring to FIG. 10, the flexible display 3 may include metal layers 31 and 32 that face the first surface 4271 of the first rotary structure 421 and the first surface 4273 of the second rotary structure 422. The metal layers 31 and 32 may be attached to the rear surface of the flexible display 3 to improve the surface quality of the flexible display 3. The metal layers 31 and 32 may not be attached to a folding area of the flexible display 3 (e.g., the area illustrated as the curved surface of the flexible display in the drawing).

Accordingly, in the state in which the first rotary structure 421 and the second rotary structure 422 are rotated, unattached areas 311 and 312 may extend toward the interior of a recess 418 that is formed in the fixed structure 41 adjacent to the folding area of the flexible display 3 (e.g., the area illustrated as the curved surface in the drawing). The unattached areas 311 and 312 may be at least partially received in the recess 418. The recess 418 of the fixed structure 41 may be have a depth sufficient to receive the unattached areas 311 and 321. Accordingly, metal layers 31 and 32 may be wider than the flat areas of the flexible display 3, thereby improving the surface quality of the flexible display 3.

Figure 11:
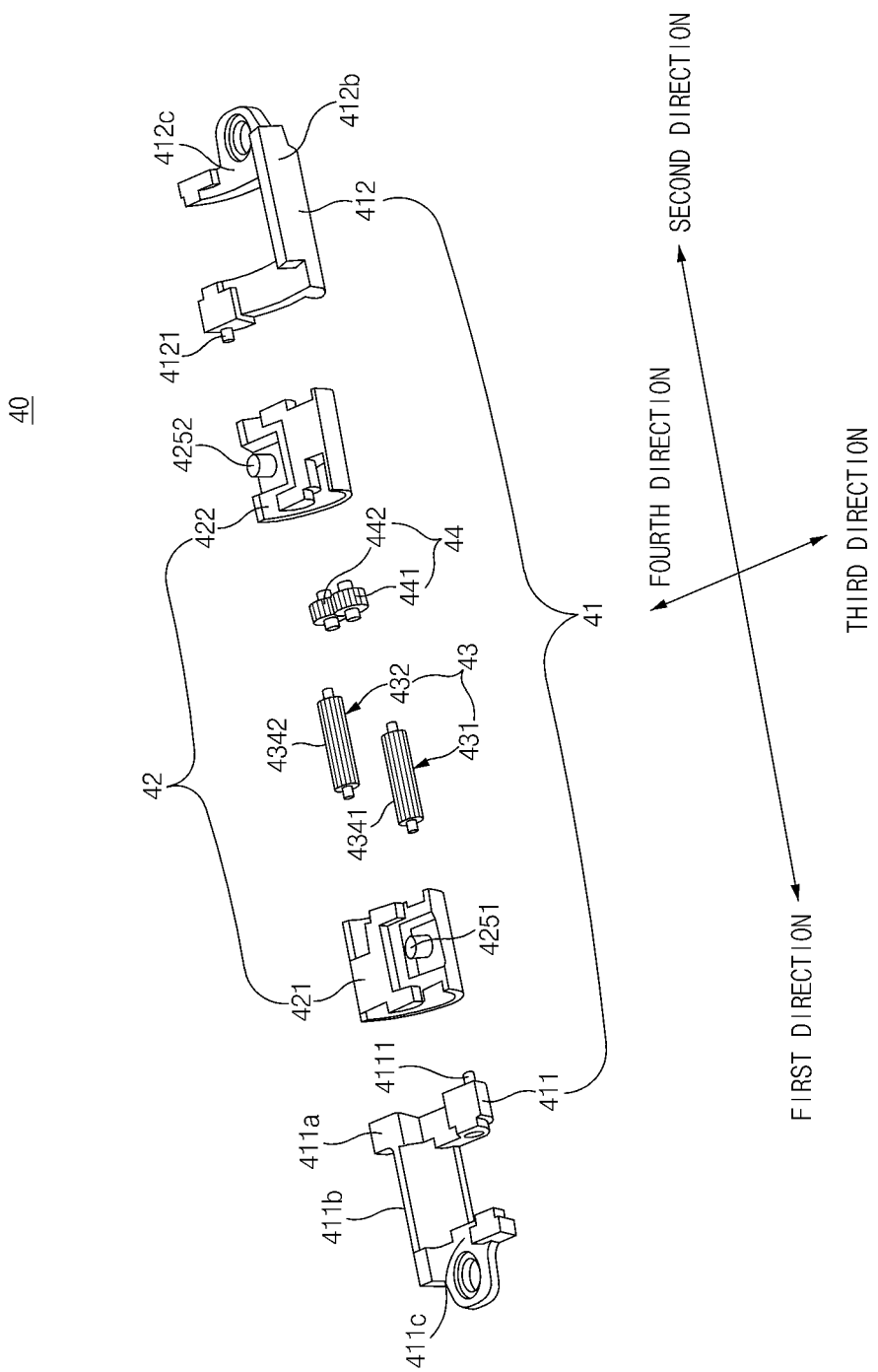
FIG. 11 is an exploded perspective view of the hinge module according to an embodiment.

FIG. 11 is an exploded perspective view of the hinge module according to an embodiment.

Referring to FIG. 11, the hinge module 40 may include the first fixed structure 411, the second fixed structure 412 coupled to one side of the first structure 411 that faces the second direction, the first rotary structure 421 coupled to the first fixed structure 411, the second rotary structure 422 coupled to the second fixed structure 412, the first connecting shaft 431 and the second connecting shaft 432 that pass through at least part of the first fixed structure 411 and at least part of the second fixed structure 412, respectively, and the sub-gears 44 disposed between the first fixed structure 411 and the second fixed structure 412.

In the illustrated embodiment, the first fixed structure 411 may include the first central portion 411a, the first support portion 411b extending from the first central portion 411a in the first direction, and the first guide portion 411c extending from the first support portion 411b in the third direction perpendicular to the first direction.

In the illustrated embodiment, an edge of the first guide portion 411c may face an edge of the first central portion 411a. The first rotary structure 421 may be disposed between the first guide portion 411c and the first central portion 411a. The first support portion 411b, together with the first guide portion 411c and the first central portion 411a, may surround the first rotary structure 421.

In the illustrated embodiment, the second fixed structure 412 may include the second central portion 412a, the second support portion 412b extending from the second central portion 412a in the second direction, and the second guide portion 412c extending from the second support portion 412b in the fourth direction perpendicular to the second direction.

In the illustrated embodiment, an edge of the second guide portion 412c may face an edge of the second central portion 412a. The second rotary structure 422 may be disposed between the second guide portion 412c and the second central portion 412a. The second support portion 412b, together with the second guide portion 412c and the second central portion 412a, may surround the second rotary structure 422.

In the illustrated embodiment, the first central portion 411a of the first fixed structure 411 may include a first coupling protrusion 4111 protruding from the first central portion 411a in the second direction. The second central portion 412a of the second fixed structure 412 may include a second coupling protrusion 4121 protruding from the second central portion 412a in the first direction. The first fixed structure 411 and the second fixed structure 412 may be coupled by inserting the first coupling protrusion 4111 into a depression formed on the second fixed structure 412 and inserting the second coupling protrusion 4121 into a depression formed on the first fixed structure 411. The sub-gears 44 may be disposed between the first fixed structure 411 and the second fixed structure 412. In some embodiments, the first fixed structure 411 and the second fixed structure 412 may be coupled by welding.

In the illustrated embodiment, the first connecting shaft 431 may be at least partially disposed in the first fixed structure 411 and the second fixed structure 412. The first connecting shaft 431 may pass through at least part of the first fixed structure 411 and at least part of the second fixed structure 412.

In the illustrated embodiment, the second connecting shaft 432 may be at least partially disposed in the first fixed structure 411 and the second fixed structure 412. The second connecting shaft 432 may pass through at least part of the first fixed structure 411 and at least part of the second fixed structure 412.

In the illustrated embodiment, the first connecting shaft 431 and the second connecting shaft 432 may include the first gear 4341 and the second gear 4342 formed on the outer circumferential surfaces thereof, respectively. The sub-gears 44 may be disposed between the first gear 4341 and the second gear 4342. An even number of sub-gears 44 may be provided to allow the first gear 4341 and the second gear 4342 to rotate in opposite directions. The first sub-gear 441 may be engaged with the first gear 4341 and the second sub-gear 4342, and the second sub-gear 442 may be engaged with the second gear 4342 and the first sub-gear 441. The sub-gears 44 may be disposed between the first fixed structure 411 and the second fixed structure 412.

In the illustrated embodiment, the central portions 411a and 412a may include the sub-gears 44 configured to link the first gear 4341 included in the first connecting shaft 431 and the second gear 4342 included in the second connecting shaft 432. The sub-gears 44 may be disposed between the first fixed structure 411 and the second fixed structure 412.

In the illustrated embodiment, the first rotary structure 421 may be disposed between the first central portion 411a and the first guide portion 411c of the first fixed structure 411 so as to make contact with the first support portion 411b. The first rotary structure 421 may include a first fastening rod 4251 by which the first rotary structure 421 is fastened to a first housing (e.g., the first housing 21 of FIG. 3). The first fastening rod 4251 may protrude in the direction perpendicular to the first direction and the third direction.

In the illustrated embodiment, the second rotary structure 422 may be disposed between the second central portion 412a and the second guide portion 412c of the second fixed structure 412 so as to make contact with the second support portion 412b. The second rotary structure 422 may include a second fastening rod 4252 by which the second rotary structure 422 is fastened to a second housing (e.g., the second housing 22 of FIG. 3). The second fastening rod 4252 may protrude in the direction perpendicular to the first direction and the third direction.

Figure 12:
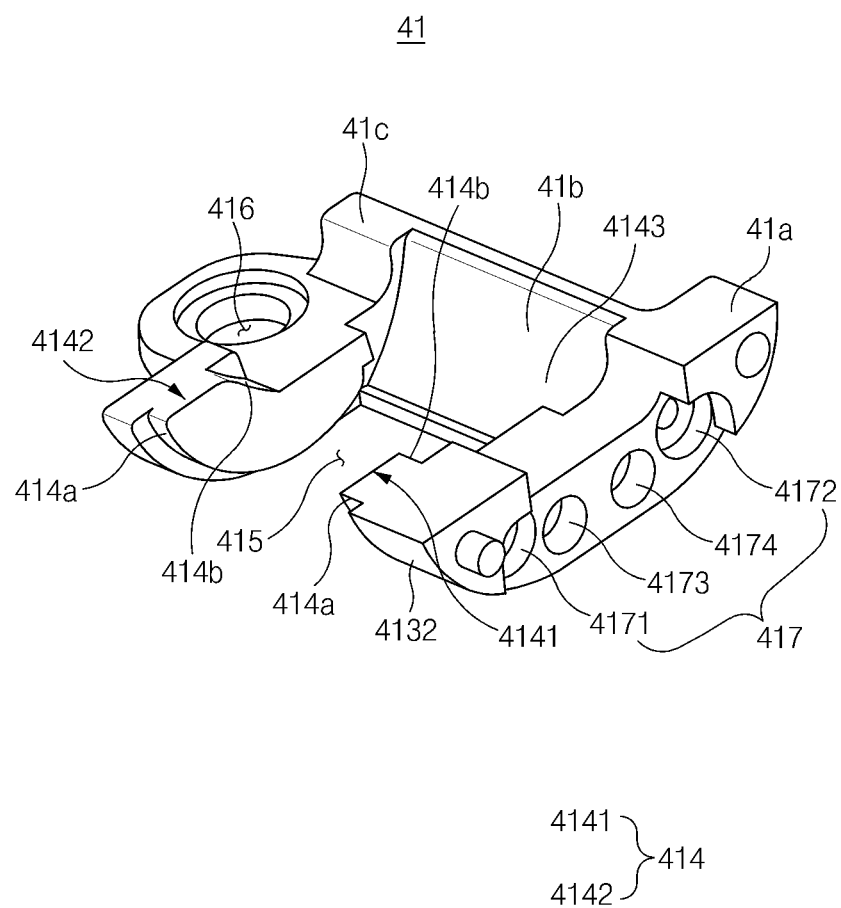
FIG. 12 is a perspective view of a fixed structure of the hinge module according to an embodiment.
Figure 13:
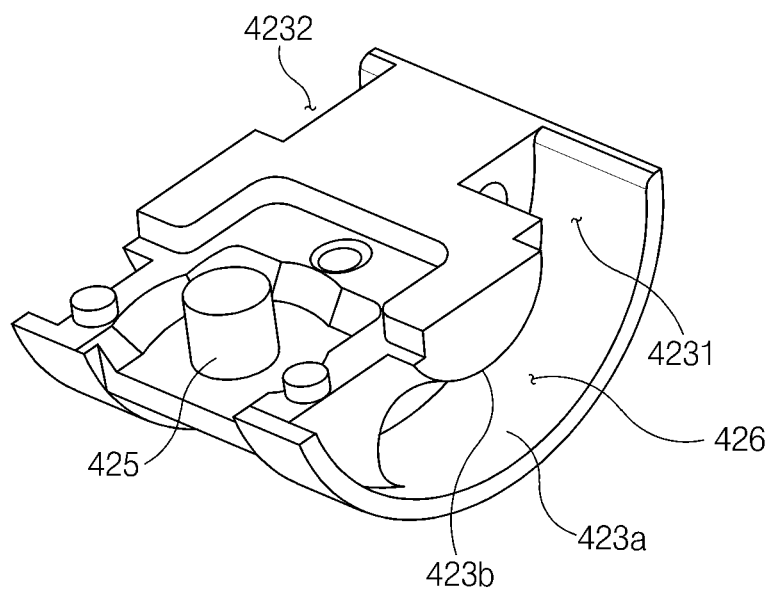
FIG. 13 is a perspective view of a rotary structure of the hinge module according to an embodiment.

FIG. 12 is a perspective view of a fixed structure of the hinge module according to an embodiment. FIG. 13 is a perspective view of a rotary structure of the hinge module according to an embodiment.

In the illustrated embodiment, the fixed structure 41 (e.g., the first fixed structure 411 or the second fixed structure 412 of FIG. 11) may include a central portion 41a (e.g., 411a or 412a of FIG. 11), a guide portion 41c (e.g., 411c or 412c of FIG. 11) an edge of which is facing the central portion 41a, and a support portion 41b (e.g., 411b or 412b of FIG. 11) that connects the central portion 41a and the guide portion 41c. The guide portion 41c, the central portion 41a, and the support portion 41b may form a space 415 therebetween. As described above, a rotary structure 42 may be disposed in the space 415.

In the illustrated embodiment, the fixed structure 41 may include a guide structure 414 for guiding the rotary structure 42 disposed in the space 415. The guide structure 414 may protrude toward the rotary structure 42 disposed in the space 415. The central portion 41a may include a first guide structure 4141 protruding toward the rotary structure 42. At least part of the first guide structure 4141 may be received in a first guide rail 4231 of the rotary structure 42.

In the illustrated embodiment, the support portion 41b may include a guide surface 4143 for supporting rotation of the rotary structure 42. The guide surface 4143 may include a circular arc surface having a curvature corresponding to the curvature of rotation of the rotary structure 42.

In the illustrated embodiment, the guide portion 41c may include a second guide structure 4142 protruding toward the rotary structure 42. At least part of the second guide structure 4142 may be received in a second guide rail 4232 of the rotary structure 42.

In the illustrated embodiment, each of the first guide structure 4141 and the second guide structure 4142 may include a first area 414a having a first radius of curvature with respect to a virtual axis of rotation (e.g., H1 or H2 of FIG. 7) and a second area 414b having a second radius of curvature from the virtual axis of rotation.

In the illustrated embodiment, the central portion 41a may include a first insertion hole 4171 into which at least part of a first connecting shaft (e.g., the first connecting shaft 431 of FIG. 11) is inserted, a second insertion hole 4172 into which at least part of a second connecting shaft (e.g., the second connecting shaft 432 of FIG. 11) is inserted, a third insertion hole 4173 into which at least part of a first sub-gear (e.g., the first sub-gear 441 of FIG. 11) is inserted, and a fourth insertion hole 4174 into which at least part of a second sub-gear (e.g., the second sub-gear 442 of FIG. 11) is inserted.

Referring to FIG. 13, the rotary structure 42 may include the first guide rail 4231 in which at least part of the first guide structure 4141 is received and the second guide rail 4232 in which at least part of the second guide structure 4142 is received.

In the illustrated embodiment, the first guide rail 4231 and the second guide rail 4232 may include first corresponding areas 423a and second corresponding areas 423b, respectively. The first corresponding areas 423a may make contact with the first areas 414a of the first guide structure 4141, and the second corresponding areas 423b may make contact with the second areas 414b of the second guide structure 4142. The first corresponding areas 423a and the second corresponding areas 423b may include circular arc surfaces having curvatures corresponding to radii of curvature of the first areas 414a and the second areas 414b, respectively.

In the illustrated embodiment, the second corresponding areas 423b of the guide rails 4231 and 4232 may be larger than the second areas 414b. For example, the central angles of the circular arc surfaces of the second areas 414b may be smaller than the central angles of the circular arc surfaces of the second corresponding areas 423b. This may be because the first guide structure 4141 and the second guide structure 4142 do not extend into the recess 418 formed on the fixed structure 41. That is, when the fixed structure 41 is viewed from above, the second areas 414b of the first guide structure 4141 and the second guide structure 4142 may not overlap the internal space of the recess 418. This is because in the case where part of the first guide structure 4141 and part of the second guide structure 4142 are formed in the recess 418, the rotation paths of the metal layers 31 and 32 of the flexible display (e.g., the flexible display 3 of FIG. 10), as described above, may collide with the first guide structure 4141 and the second guide structure 4142.

In the illustrated embodiment, the rotary structure 42 may include the first guide rail 4231 and the second guide rail 4232 that are in different shapes. For example, the second guide rail 4232 may have a larger depth than the first guide rail 4231 in the direction of the virtual axis of rotation (e.g., H1 or H2 of FIG. 7). This is designed so as to prevent the direction of the rotary structure 42 from being changed when assembling the rotary structure 42 to the fixed structure 41.

Referring to FIG. 13, the rotary structure 42 may be disposed such that the portion on which the fastening rod 425 is formed is located away from the support portion 41b. To guide the correct assembly direction of the rotary structure 42, the first guide structure 4141 of the fixed structure 41 may protrude toward the rotary structure 42 further than the second guide structure 4142, and correspondingly, the first guide rail 4231 may have a larger depth than the second guide rail 4232.

Figure 14:
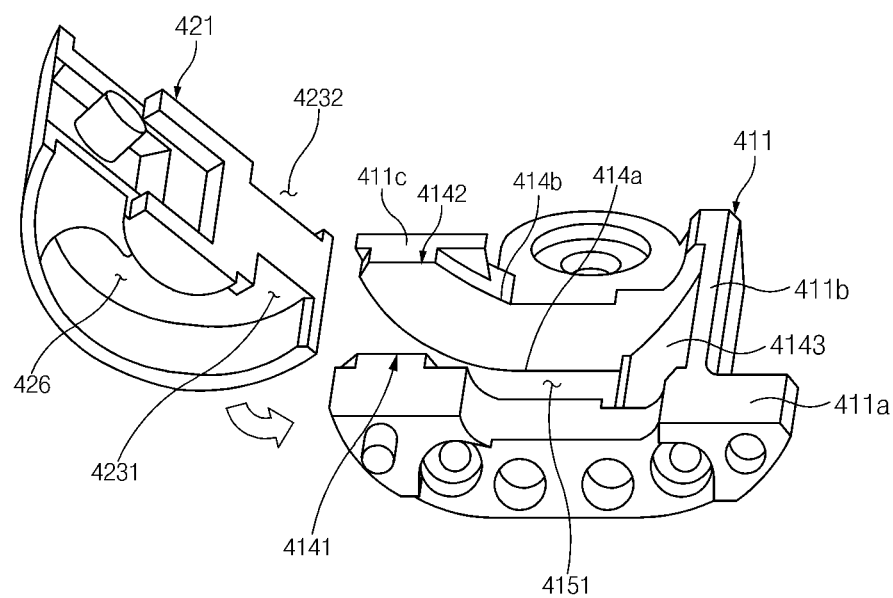
FIG. 14 is a view illustrating assembly of a first fixed structure and the first rotary structure according to an embodiment.

FIG. 14 is a view illustrating assembly of the first fixed structure and the first rotary structure according to an embodiment.

In the illustrated embodiment, the first rotary structure 421 may be rotated such that the first guide structure 4141 of the first fixed structure 411 is inserted into one end portion of the first guide rail 4231. At this time, the first rotary structure 421 may be rotated about the virtual axis of rotation (e.g., H1 of FIG. 7). The first space 4151 is adapted to receive the first rotary structure 421. Accordingly, the first rotary structure 421 may be easily inserted into the first space 4151.

According to an embodiment, the second guide structure 4142 of the first fixed structure 411 may be formed on the first guide portion 411c, and the first guide structure 4141 of the first fixed structure 411 may be formed on the first central portion 411a. The first guide rail 4231 and the second guide rail 4232 may be concavely formed on opposite sides of the first rotary structure 421. Accordingly, end portions of the guide structures 4141 and 4142 may be inserted into the inlets of the guide rails 4231 and 4232.

Referring to FIG. 14, the first rotary structure 421 may be inserted into the first space 4151 by sliding along the guide surface 4143 in the state in which the guide structures 4141 and 4142 are received in the guide rails 4231 and 4232. The sliding motion of the first rotary structure 421 may include rotation of the first rotary structure 421 about the virtual axis of rotation (e.g., H1 of FIG. 7).

Figure 15:
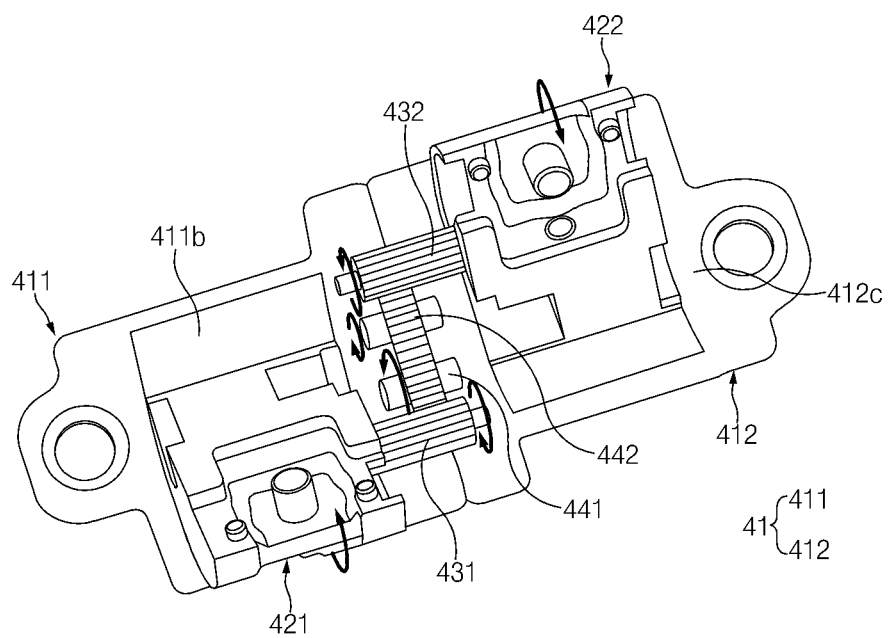
FIG. 15 is a view illustrating a motion of the hinge module according to an embodiment.

FIG. 15 is a view illustrating a motion of the hinge module according to an embodiment.

The hinge module 40 may include the fixed structure 41 and the rotary structures 421 and 422. The first rotary structure 421 may be surrounded by the first central portion 411a, the first guide portion 411c, and the first support portion 411b. The second rotary structure 422 may be surrounded by the second central portion 412a, the second guide portion 412c, and the second support portion 412b. The first connecting shaft 431 may pass through at least part of the first central portion 411a, at least part of the second central portion 412a, and the first rotary structure 421, and the second connecting shaft 432 may pass through at least part of the first central portion 411a, at least part of the second central portion 412a, and the second rotary structure 422. An even number of sub-gears 441 and 442 may be provided between the first connecting shaft 431 and the second connecting shaft 432. Accordingly, the first rotary structure 421 and the second rotary structure 422 may rotate in opposite directions.

For example, when the first rotary structure 421 rotates in a first rotational direction (the counterclockwise direction), the first connecting shaft 431 may rotate in a second rotational direction (the clockwise direction), the first sub-gear 441 may rotate in the first rotational direction (the counterclockwise direction), the second sub-gear 442 may rotate in the second rotational direction (the clockwise direction), the second connecting shaft 432 may rotate in the first rotational direction (the counterclockwise direction), and the second rotary structure 422 may rotate in the second rotational direction (the clockwise direction).

Figure 16:
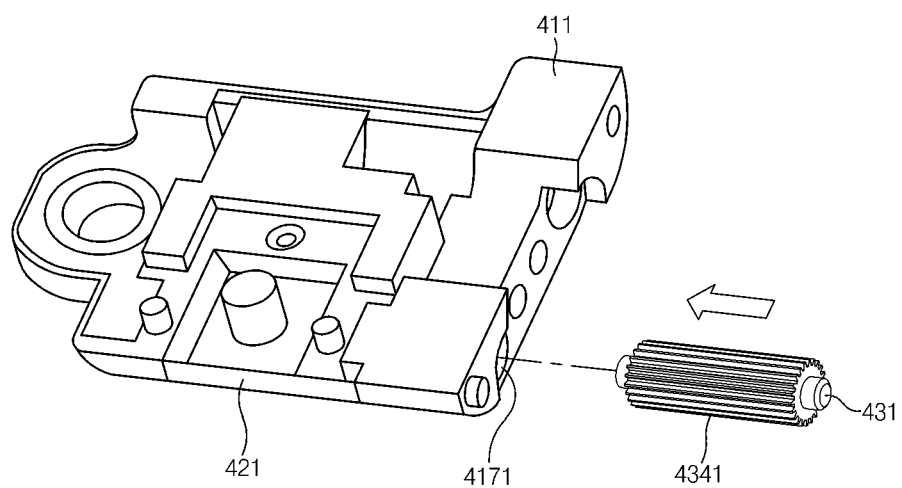
FIG. 16 is a view illustrating assembly of the first fixed structure and a first connecting shaft of the hinge module according to an embodiment.
Figure 17:
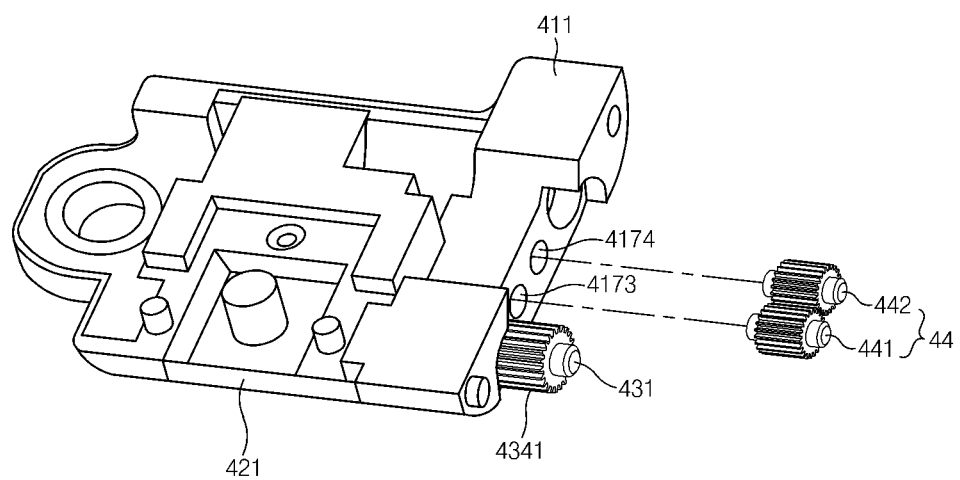
FIG. 17 is a view illustrating assembly of the first fixed structure and sub-gears of the hinge module according to an embodiment.
Figure 18:
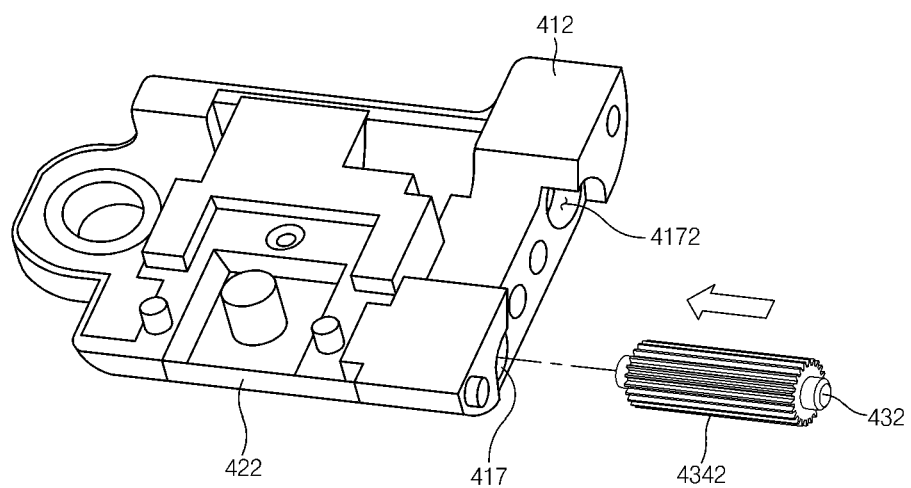
FIG. 18 is a view illustrating assembly of a second fixed structure, to which the second rotary structure is assembled, and a second connecting shaft of the hinge module according to an embodiment.
Figure 19:
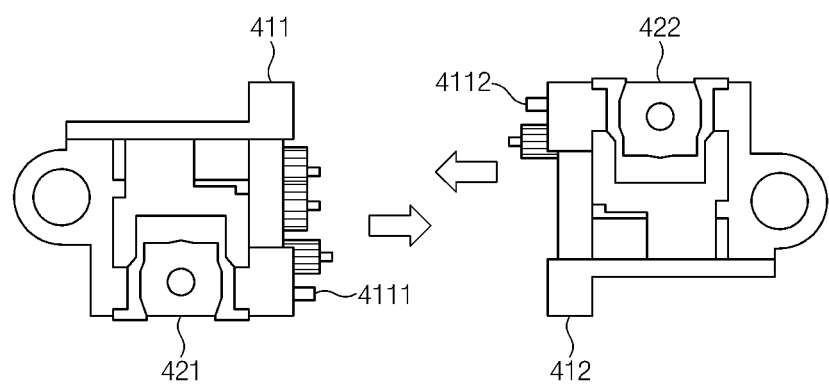
FIG. 19 is a view illustrating insertion-coupling of the first fixed structure and the second fixed structure of the hinge module according to an embodiment.

FIG. 16 is a view illustrating assembly of the first fixed structure and the first connecting shaft of the hinge module according to an embodiment. FIG. 17 is a view illustrating assembly of the first fixed structure and the sub-gears of the hinge module according to an embodiment. FIG. 18 is a view illustrating assembly of the second fixed structure, to which the second rotary structure is assembled, and the second connecting shaft of the hinge module according to an embodiment. FIG. 19 is a view illustrating insertion-coupling of the first fixed structure and the second fixed structure of the hinge module according to an embodiment.

Referring to FIG. 16, the first fixed structure 411 may have the first insertion hole 4171 into which the first connecting shaft 431 is inserted. The first connecting shaft 431 may be inserted into the first insertion hole 4171. At this time, a portion of the first connecting shaft 431 on which the first gear 4341 is formed may not be inserted into the first fixed structure 411. FIG. 19 is a view illustrating assembly of the first fixed structure 411 and the second fixed structure 412 of the hinge module according to an embodiment.

Referring to FIG. 17, the first fixed structure 411 may have the insertion holes 4173 and 4174 into which the sub-gears 441 and 442 are inserted. After the assembly of the first connecting shaft 431, the first sub-gear 441 may be inserted into the third insertion hole 4173 formed in the first fixed structure 411, and the second sub-gear 442 may be inserted into the fourth insertion hole 4174. The first sub-gear 441 and the second sub-gear 442 may be inserted into the third insertion hole 4173 and the fourth insertion hole 4174, respectively, such that the first sub-gear 441 is engaged with the first gear 4341 of the first connecting shaft 431 and the first sub-gear 441 and the second sub-gear 442 are engaged with each other. The assembly of the second rotary structure 422 and the second fixed structure 412 is described above in connection with FIG. 15.

Referring to FIG. 18, the second fixed structure 412 may have the second insertion hole 4172 into which the second connecting shaft 432 is inserted. A portion of the second connecting shaft 432 on which the second gear 4342 is formed may not be inserted into the second fixed structure 412.

Referring to FIG. 19, the first fixed structure 411 and the second fixed structure 412 may include the first coupling protrusion 4111 and the second coupling protrusion 4121, respectively. The first fixed structure 411 and the second fixed structure 412 may be coupled together such that the first coupling protrusion 4111 is inserted into the depression of the second fixed structure 412 and the second coupling protrusion 4121 is inserted into the depression of the first fixed structure 411.

Referring to FIG. 19, the first fixed structure 411 and the second fixed structure 412 may be arranged such that the first rotary structure 421 and the second rotary structure 422, which are coupled to the first fixed structure 411 and the second fixed structure 412, respectively, rotate in opposite directions. For example, the spaces into which the first rotary structure 421 and the second rotary structure 422 are inserted may be open in opposite directions (e.g., the fourth direction and the third direction of FIG. 8). That is, the coupling directions in which the first rotary structure 421 and the second rotary structure 422 are coupled to the fixed structures 411 and 412 may be opposite to each other, and the rotational directions of the first rotary structure 421 and the second rotary structure 422 may be opposite to each other.

Figure 20:
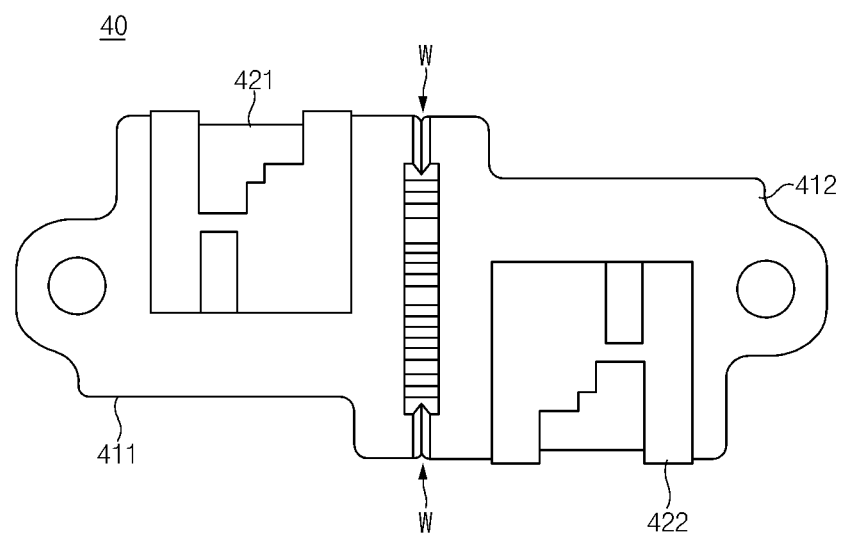
FIG. 20 is a view illustrating welding of the first fixed structure and the second fixed structure of the hinge module according to another embodiment.

FIG. 20 is a view illustrating welding of the first fixed structure and the second fixed structure of the hinge module according to another embodiment.

Referring to FIG. 20, the first fixed structure 411 and the second fixed structure 412 may be coupled together by another method. For example, the first fixed structure 411 and the second fixed structure 412 may be coupled by welding W. The welding may be done by electric welding, gas welding, laser welding, and the like. In another example, the first fixed structure 411 and the second fixed structure 412 may be coupled by screws, bolts, rivets, etc.

Figure 21:
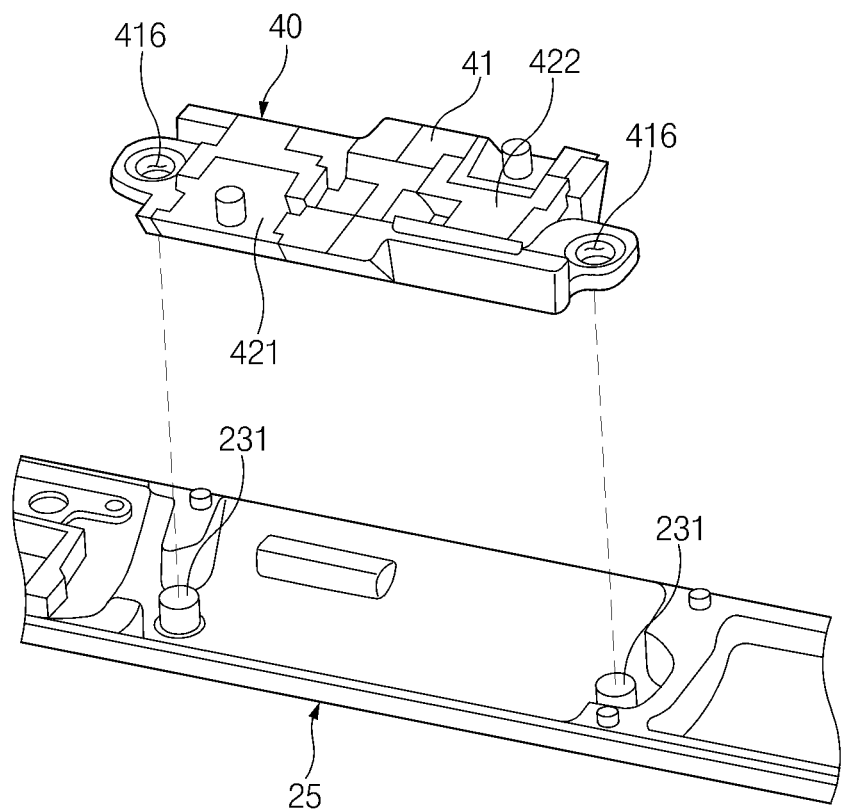
FIG. 21 is a view illustrating assembly of the hinge housing and the fixed structure of the hinge module according to an embodiment.

FIG. 21 is a view illustrating assembly of the hinge housing and the fixed structure of the hinge module according to an embodiment.

Referring to FIG. 21, the hinge structure 41 may include fastening holes 416 for fixing the fixed structure 41 to the hinge housing 25. The hinge housing 25 may include rods 231 protruding from the inside of the hinge housing 25. The hinge module 40 may be fixed to the hinge housing 25 by mounting the guide portions 411c and 412c of the fixed structure 41, which have the fastening holes 416 formed therein, onto the rods 231 formed on the inside of the hinge housing 25. However, the coupling structure of the hinge housing 25 and the fixed structure 41 disclosed herein is not limited to the method illustrated in the drawing is only an example.

The hinge module 40 according to the embodiment disclosed herein may include the fixed structure 41 that includes the guide portion 41c and the central portion 41a that guide opposite end portions of the rotary structure 42 in the direction of the virtual axis of rotation H1 or H2, thereby fixing the displacement of the rotary structure 42 in the direction of the virtual axis of rotation H1 or H2.

Figure 22:
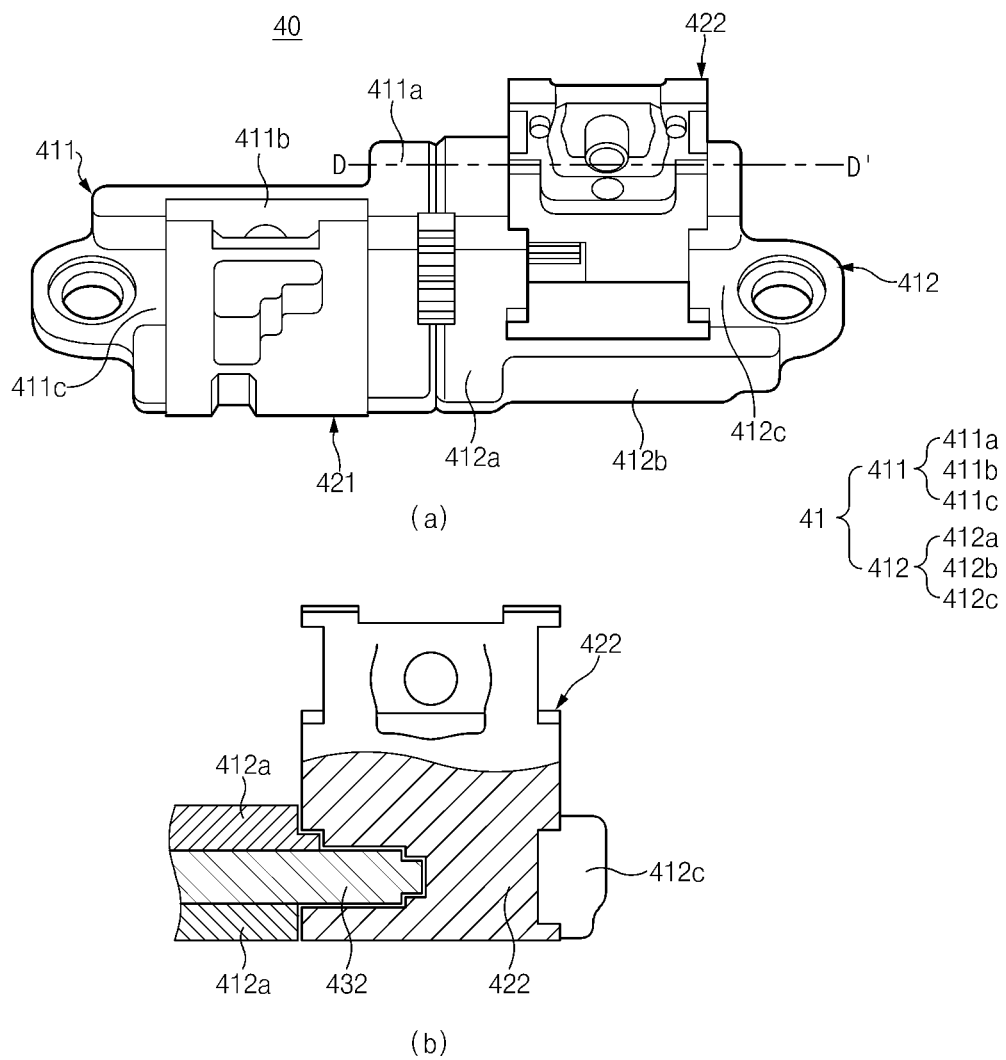
FIG. 22 is a view illustrating an invariance of the displacement of the rotary structure when an external force is axially applied to the hinge module according to an embodiment.

FIG. 22 is a view illustrating an invariance of the displacement of the rotary structure when an external force is axially applied to the hinge module according to an embodiment.

Referring to FIG. 22, the fixed structure 41 may include the first fixed structure 411 and the second fixed structure 412 that is coupled to the first fixed structure 411. The first fixed structure 411 and the second fixed structure 412 may be coupled together by welding to form one fixed structure, or may be coupled together by insertion-coupling so as to be removable, as described above.

In the illustrated embodiment, the first fixed structure 411 may include the first central portion 411a, the first support portion 411b, and the first guide portion 411c. At least part of the first rotary structure 421 may be surrounded by the first central portion 411a, the first support portion 411b, and the first guide portion 411c. The first rotary structure 421 may be disposed between the first central portion 411a and the first guide portion 411c.

In the illustrated embodiment, the second fixed structure 412 may include the second central portion 412a, the second support portion 412b, and the second guide portion 412c. At least part of the second rotary structure 422 may be surrounded by the second central portion 412a, the second support portion 412b, and the second guide portion 412c. The second rotary structure 422 may be disposed between the second central portion 412a and the second guide portion 412c.

In an embodiment, when an external force F is axially applied to the hinge module 40, the axial displacement of the first rotary structure 421 or the second rotary structure 422 may be constrained by the guide portion 411c or 412c located on one side of the first fixed structure 411 and the second fixed structure 412 and the central portion 411a or 412a located on the opposite side thereof.

For example, some hinge modules may include a separate elastic member to apply an axial constraint force to the rotary structure. In contrast, the hinge module 40 according to the embodiment disclosed herein may fix the axial displacement of the rotary structures 421 and 422 even though the hinge module 40 does not additionally include the separate elastic component. Accordingly, the hinge module 40 is able to be stably driven, and thus the reliability of the product may be improved. In addition, the number of components included in the hinge module 40 may be reduced, which makes it possible to simplify the assembly process and reduce the failure rate.

Figure 23A:
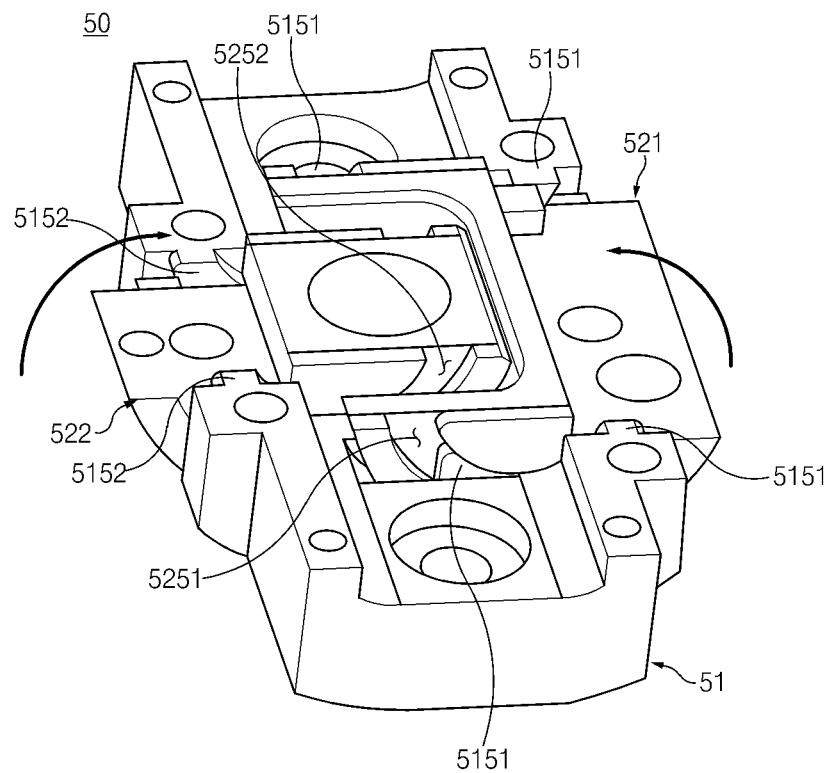
FIGS. 23A and 23B are perspective views of a hinge module according to an embodiment.
Figure 23B:
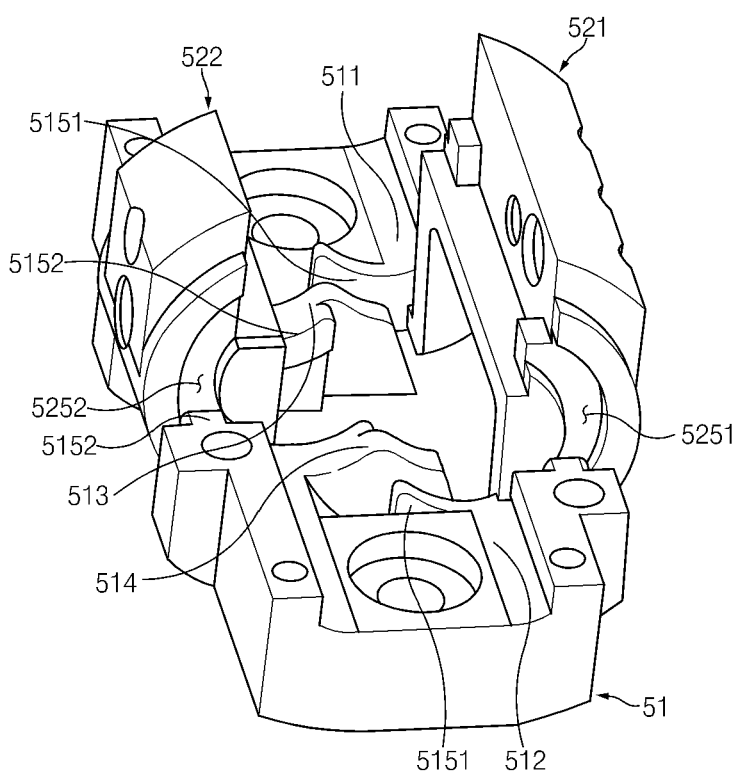
Figure 24:
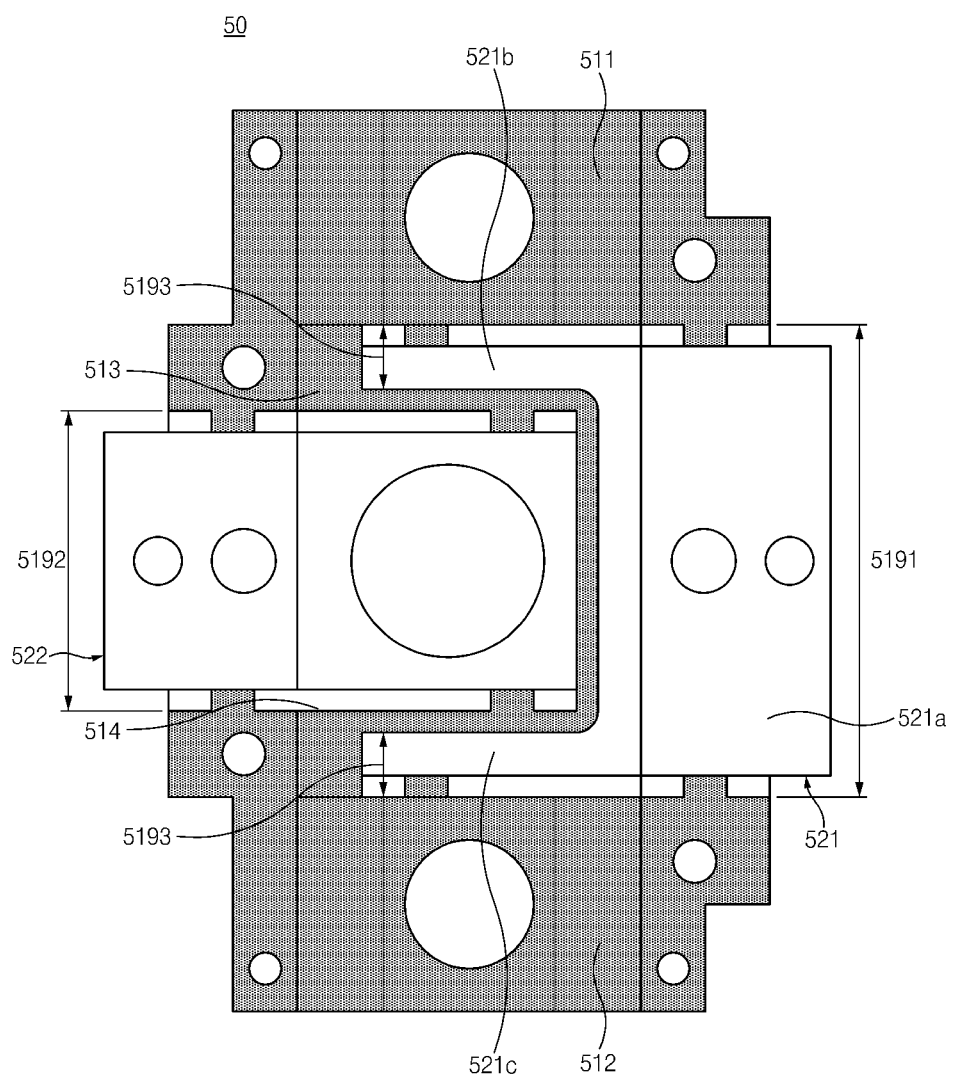
FIG. 24 is a plan view of the hinge module according to an embodiment.
Figure 25A:
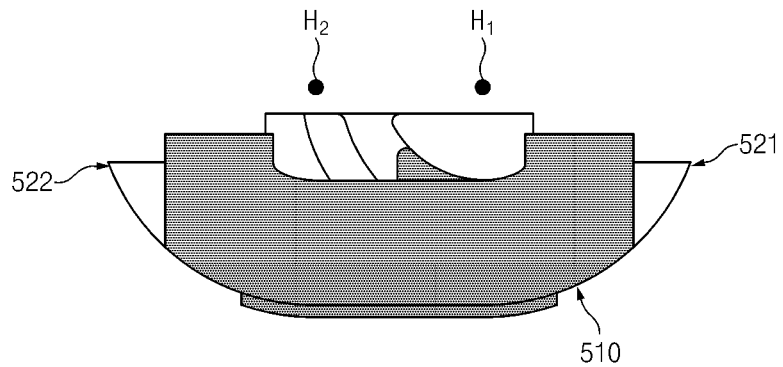
FIGS. 25A and 25B are views illustrating a rotational motion of the hinge module according to an embodiment.
Figure 25B:
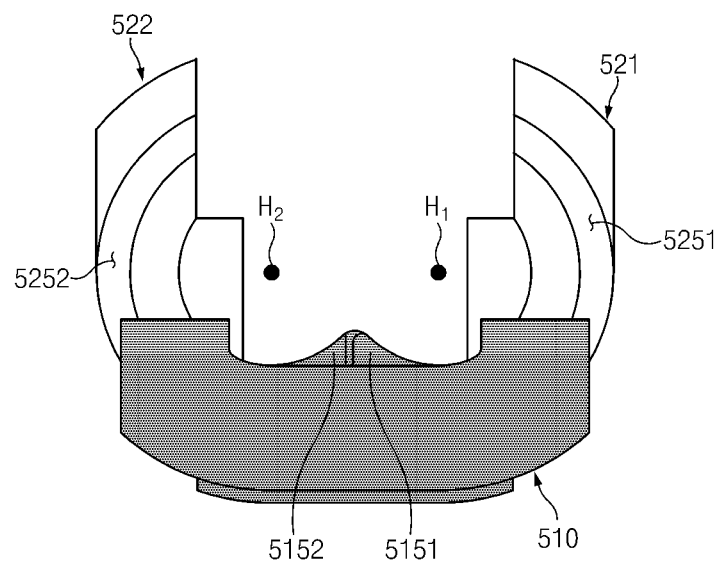

FIGS. 23A and 23B are perspective views of a hinge module according to an embodiment. FIG. 24 is a plan view of the hinge module according to an embodiment. FIGS. 25A and 25B are views illustrating a rotational motion of the hinge module according to an embodiment.

Hereinafter, the hinge module described above with reference to FIGS. 6 to 22 is referred to as the first hinge module 40, and the hinge module that will be described below is referred to as the second hinge module 50.

Referring to FIGS. 23A and 23B, the second hinge module 50 may include a fixed structure 51, and a first rotary structure 521 and a second rotary structure 522 that are coupled to the fixed structure 51 so as to be rotatable.

In the illustrated embodiment, the fixed structure 51 may include a first sidewall 511, a second sidewall 512, a third sidewall 513, and a fourth sidewall 514 that face the axis for which the first rotary structure 521 and the second rotary structure 522 rotate. The direction of the axis is referred to here as an axial direction. The third sidewall 513 and the fourth sidewall 514 may be disposed between the first sidewall 511 and the second sidewall 512. A first space 5191 may be formed between the first sidewall 511 and the second sidewall 512. The third sidewall 513 and the fourth sidewall 514 may be disposed in the first space 5191. A second space 5192 may be formed between the third sidewall 513 and the fourth sidewall 514. A third space 5193 may be formed between the first sidewall 511 and the third sidewall 513 and between the second sidewall 512 and the fourth sidewall 514.

In the illustrated embodiment, the first rotary structure 521 may include a body 521a, and a first extension 521b and a second extension 521c that extend from one side of the body 521a. The first extension 521b and the second extension 521c may extend from the body 521a in a direction perpendicular to the axial direction. The first extension 521b and the second extension 521c may be disposed in the third spaces 5193. The body 521a of the first rotary structure 521 may be disposed in the first space 5191. The second rotary structure 522 may be disposed in the second space 5192.

In the illustrated embodiment, the first sidewall 511 and the second sidewall 512 may include first guide structures 5151 that protrude toward the first extension 521b and the second extension 521c, respectively. The first extension 521b and the second extension 521c may include first guide rails 5251 in which the first guide structures 5151 are at least partially received, respectively.

In the illustrated embodiment, each of the third sidewall 513 and the fourth sidewall 514 may include a second guide structure 5152 protruding toward the second rotary structure 522. The second rotary structure 522 may include a second guide rail 5252 in which at least part of the second guide structure 5152 is received.

In an embodiment, when in the flat state (FIG. 23A), at least part of the second rotary structure 522 may be disposed between the first extension 521b and the second extension 521c of the first rotary structure 521.

Referring to FIGS. 25A and 25B, the first rotary structure 521 and the second rotary structure 522 may rotate about a first virtual axis of rotation and a second virtual axis of rotation, respectively. The first guide rails 5251 of the first rotary structure 521 may be in a circular arc shape. The first guide structures 5151 may be in a circular arc shape so as to be received in the first guide rails 5251. The second guide rails 5252 of the second rotary structure 522 may be in a circular arc shape. The second guide structures 5152 may be in a circular arc shape so as to be received in the second guide rails 5252.

Unlike the first hinge module 40 described above with reference to FIGS. 6 to 21, the second hinge module 50 illustrated in FIGS. 23A to 25B does not include a gear structure (e.g., the connecting shaft 43 and the sub-gears 44 of FIG. 11) that links the first rotary structure 521 and the second rotary structure 522, and therefore the first rotary structure 521 and the second rotary structure 522 may be independently driven. Accordingly, the second hinge module 50 may be smoothly driven without noise or vibration caused by gear engagement. However, the hinge assembly (e.g., the hinge assembly 4 of FIG. 3) of the electronic device may include the second hinge module 50 and at least one first hinge module 40. Accordingly, the first rotary structure 521 and the second rotary structure 522 of the second hinge module 50 may be linked with each other by the first hinge module 40.

A hinge module 40 according to an embodiment of the disclosure may include a first fixed structure 411 that includes a first central portion 411a, a first support portion 411b extending from the first central portion 411a in a first direction, and a first guide portion 411c extending from the first support portion 411b in a third direction perpendicular to the first direction, a second fixed structure 412 that includes a second central portion 412a coupled to one side of the first central portion 411a that faces a second direction opposite to the first direction, a second support portion 412b extending from the second central portion 412a in the second direction, and a second guide portion 412c extending from the second support portion 412b in a fourth direction perpendicular to the second direction, the second fixed structure being integrally or removably coupled to the first fixed structure, a first connecting shaft 431 that includes a first gear 4341 formed on at least a part of an outer circumferential surface thereof and extends in the first direction and that passes through at least a part of the first central portion 411a of the first fixed structure 411 such that at least a part of the first gear 4341 is disposed between the first central portion and the first guide portion 411c, a first rotary structure 421 that is disposed between the first guide portion 411c and the first central portion 411a and that includes a first circular arc shaped gear 4241 engaged with the first gear 4341, the first rotary structure being coupled with the first connecting shaft 431 so as to be rotated about a first virtual axis of rotation H1 passing through a center of a circular arc of the first circular arc shaped gear 4241, a second connecting shaft 432 that includes a second gear 4342 formed on at least a part of an outer circumferential surface thereof and extends in the second direction and that passes through at least a part of the second central portion 412a of the second fixed structure 412 such that at least a part of the second gear 4342 is disposed between the second central portion 412a and the second guide portion 411c, the first connecting shaft 431 and the second connecting shaft 432 being linked with each other so as to be rotated in opposite directions, and a second rotary structure 422 that is disposed between the second guide portion 411c and the second central portion 412a that includes a second circular arc shaped gear 4242 engaged with the second gear 4342, the second rotary structure being configured to be rotated about a second virtual axis of rotation H2 passing through a center of a circular arc of the second circular arc shaped gear 4242, by rotation of the second connecting shaft 432.

In an embodiment, the first rotary structure may have a first opening formed therein in a first circular arc shape, the first circular arc shaped gear may be a first internal gear formed on an inner wall of the first opening and engaged with the first gear of the first connecting shaft, the second rotary structure may have a second opening formed therein in a second circular arc shape, and the second circular arc shaped gear may be a second internal gear formed on an inner wall of the second opening and engaged with the second gear of the second connecting shaft.

In an embodiment, the hinge module may further include an even number of sub-gears 441 and 442 that are disposed between the first central portion and the second central portion and that link the first connecting shaft 431 and the second connecting shaft 432.

In an embodiment, the first central portion 411a and the second central portion 412a may include first guide structures 4141 protruding toward the first rotary structure 421 and the second rotary structure 422, respectively, and the first guide portion 411c and the second guide portion 412c may include second guide structures 4142 protruding toward the first rotary structure 421 and the second rotary structure 422, respectively. The first rotary structure 421 may include first guide rails 4231 formed on opposite surfaces of the first rotary structure and configured to receive at least a part of the first guide structure 4141, and the second rotary structure may include second guide rails 4232 formed on opposite surfaces of the second rotary structure and configured to receive at least a part of the second guide structure 4142.

In an embodiment, each of the first guide rails 4231 may include a first curved surface 423a having a first radius of curvature with respect to the first virtual axis of rotation H1 and a second curved surface 423b having a second radius of curvature smaller than the first radius of curvature with respect to the first virtual axis of rotation H1, and the first guide structure 4141 may be disposed between the first curved surface 423a and the second curved surface 423b. Each of the second guide rails 4232 may include a third curved surface 423a having the first radius of curvature with respect to the second virtual axis of rotation H2 and a fourth curved surface 423b having the second radius of curvature with respect to the second virtual axis of rotation H2, and the second guide structure 4142 may be disposed between the third curved surface 423a and the fourth curved surface 423b.

In an embodiment, the first guide structure 4141 may include a first corresponding curved surface 414a that makes contact with the first curved surface 423a of the first guide rail 4231 and a second corresponding curved surface 414b that makes contact with the second curved surface 423b of the first guide rail 4231, a central angle of a circular arc of the second corresponding curved surface 414b may be smaller than a central angle of a circular arc of the second curved surface 423b, the second guide structure 4142 may include a third corresponding curved surface 414a that makes contact with the third curved surface 423a of the second guide rail 4232 and a fourth corresponding curved surface 414b that makes contact with the fourth curved surface 423b of the second guide rail 4232, and a central angle of a circular arc of the fourth corresponding curved surface 414b may be smaller than a central angle of a circular arc of the fourth curved surface 423b.

In an embodiment, the first rotary structure 421 may include a first curved surface 4272 having a first radius of curvature with respect to the first virtual axis of rotation H1, the first support portion 411b may include a first corresponding curved surface 4143 that supports the first curved surface 4272 to support the rotation of the first rotary structure 421, the second rotary structure 422 may include a second curved surface 4274 having a second radius of curvature with respect to the second virtual axis of rotation H2, and the second support portion 412b may include a second corresponding curved surface 4143 that supports the second curved surface 4274 to support the rotation of the second rotary structure 422.

In an embodiment, the first circular arc shaped gear 4241 may be between the first connecting shaft 431 and the first virtual axis of rotation H1 in a radial direction from the first virtual axis of rotation H1, and the second circular arc shaped gear 4242 may be between the second connecting shaft 432 and the second virtual axis of rotation H2 in a radial direction from the second virtual axis of rotation H2.

A hinge module according to an embodiment of the disclosure may include a fixed structure 411 that includes a central portion 411a, a guide portion 411c having an edge facing an edge of the central portion 411a, and a support portion 411b that connects the central portion 411a and the guide portion 411c, an interior space being formed between the central portion 411a and the guide portion 411c, a connecting shaft 431 that extends into the interior space through the central portion 411a and that includes a gear 4341 formed on at least a part of an outer circumferential surface of the connecting shaft, and a rotary structure 421 that is disposed in the interior space and that includes a circular arc shaped gear 4241 that includes a plurality of gear teeth arranged in a circular arc shape and that are engaged with the gear 4341, in which the rotary structure 421 rotates about a virtual axis of rotation H1 passing through a center of a circular arc of the circular arc shaped gear 4241.

In an embodiment, the central portion 411a may face a direction of the virtual axis of rotation H1, and the support portion 411b may face a direction perpendicular to the direction of the virtual axis of rotation H1.

In an embodiment, the rotary structure 421 may have a circular arc shaped opening 426 formed therein through which at least a part of the connecting shaft 431 passes, and the circular arc shaped gear 4241 may be an internal gear 4241 formed on an inner wall of the opening 426 and engaged with the gear 4341 of the connecting shaft 431.

In an embodiment, the internal gear 4241 may be between the connecting shaft 431 and the virtual axis of rotation H1.

In an embodiment, the central portion 411a and the guide portion 411c may include guide structures 414 protruding toward the interior space, respectively, and the rotary structure 421 may include guide rails 4231 and 4232 configured to receive the guide structures 414.

In an embodiment, the guide rails 4231 and 4232 may include first curved surfaces 423a spaced apart from the virtual axis of rotation H1 by a first distance in a radial direction and second curved surfaces 423b spaced apart from the virtual axis of rotation H1 by a second distance in the radial direction, and the guide structures 414 may be received between the first curved surfaces 423a and the second curved surfaces 423b of the guide rails.

In an embodiment, the guide structures 414 may include first corresponding curved surfaces 414a that make contact with the first curved surfaces 423a of the guide rails 4231 and 4232 and second corresponding curved surfaces 414b that make contact with the second curved surfaces 423b of the guide rails 4231 and 4232, and central angles of circular arcs of the second corresponding curved surfaces 414b may be smaller than central angles of circular arcs of the second curved surfaces 423b.

In an embodiment, the support portion 411b may include a curved surface formed to support the rotation of the rotary structure 421.

An electronic device according to an embodiment of the disclosure may include a housing structure including a first housing 21, a second housing 22, and a hinge housing 25 disposed between the first housing 21 and the second housing 22, a flexible display 30 that is disposed on the housing structure so as to extend from the first housing 21 to the second housing 22 and that includes a first area formed of a flat surface of the first housing, a second area formed of a flat surface of the second housing, and a folding area formed between the first area and the second area and configured to be folded to be flat or curved, and a hinge module 40 disposed in the hinge housing 25 and configured to rotate the first housing 21 about a first virtual axis of rotation H1 extending in a first direction and rotate the second housing 22 about a second virtual axis of rotation H2 parallel to the first virtual axis of rotation H1. The hinge module may include a fixed structure 41 fixedly disposed in the hinge housing 25, the fixed structure including a central portion 411a, 412a, a first support portion 411b extending from the central portion 411a, 412a in the first direction, a first guide portion 411c extending from the first support portion 411b in a third direction perpendicular to the first direction, a second support portion 412b extending from the central portion 411a, 412a in a second direction opposite to the first direction, and a second guide portion 412c extending from the second support portion 412b in a fourth direction perpendicular to the second direction, a first rotary structure 421 disposed between the first guide portion 411c and the central portion 411a, 412a and connected with the first housing 21, and a second rotary structure 422 disposed between the second guide portion 412c and the central portion 411a, 412a and connected with the second housing 22.

In an embodiment, the first rotary structure 421 may be configured to rotate about the first virtual axis of rotation H1 in a first rotational direction, and the second rotary structure 422 may be configured to rotate about the second virtual axis of rotation H2 in a second rotational direction opposite the first rotational direction.

In an embodiment, the hinge module 40 may further include a first connecting shaft 431 that extends from the central portion 411a, 412a in the first direction and includes a first gear 4341 and that passes through at least a part of the central portion 411a, 412a such that at least a part of the first gear 4341 is disposed between the first guide portion 411c and the central portion 411a, 412a and a second connecting shaft 432 that extends from the central portion 411a, 412a in the second direction and includes a second gear 4342 and that passes through at least a part of the central portion 411a, 412a such that at least a part of the second gear 4342 is disposed between the second guide portion 412c and the central portion 411a, 412a. The central portion 411a, 412a may include an even number of sub-gears 441 and 442 that connect the first gear 4341 and the second gear 4342 to rotate the first connecting shaft 431 and the second connecting shaft 432 in opposite directions. The first rotary structure 421 may include a first opening 4261 having a first circular arc shape whose center coincides with the first virtual axis of rotation H1 and a first internal gear 4241 formed in the first opening 4261 and engaged with the first gear 4341, and the second rotary structure 422 may include a second opening 4262 having a second circular arc shape whose center coincides with the second virtual axis of rotation H2 and a second internal gear 4242 formed in the second opening 4262 and engaged with the second gear 4342.

In an embodiment, the first guide portion 411c and the central portion 411a, 412a may include first guide structures 4141 protruding toward the first rotary structure 421, respectively, and the first rotary structure 411 may include first guide rails 4231 formed on opposite surfaces of the first rotary structure and configured to receive at least a part of the first guide structures 4141. The second guide portion 412c and the central portion 411a, 412a may include second guide structures 4142 protruding toward the second rotary structure 422, respectively, and the second rotary structure 422 may include second guide rails 4232 formed on opposite surfaces of the second rotary structure and configured to receive at least a part of the second guide structures 4142 are received.

The hinge module and the electronic device including the same according to the certain embodiments of the disclosure include a relatively small number of components, thereby achieving a simple assembly process and a reduction in failure rate.

In addition, according to the certain embodiments of the disclosure, the rotation of the rotary structure may be constrained without a separate elastic member even when an external impact (e.g., from a drop) is applied.

In addition, the disclosure may provide various other effects and advantages that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A portable communication device comprising:
    a housing including a first housing portion and a second housing portion;
    a flexible display, wherein at least portion of the flexible display is accommodated in the first housing portion and the second housing portion; and
    a first hinge module connected to the first housing portion and the second housing portion, the first hinge module including:
    a fixed structure including two first guide structures and two second guide structures;
    a first rotary structure including two first guide rails and a recess, the first rotary structure configured to rotate about a first axis by the two first guide structures, wherein the two first guide rails slide along the two first guide structures, respectively; and
    a second rotary structure including two second guide rails, the second rotary structure configured to rotate about a second axis by the two second guide structures, wherein the two second guide rails slide along the two second guide structures, respectively,
    wherein when the housing is unfolded, a first portion of the second rotary structure is positioned in the recess and a second portion of the second rotary structure is positioned out of the recess, and when the housing is folded, the first and second portions of the second rotary structure are positioned out of the recess.

2. The portable communication device of claim 1, wherein the first rotary structure includes a body portion, a first extending portion protruding from a first end of the body portion, and a second extending portion protruding from a second end of the body portion and substantially parallel with the first extending portion,
    wherein the recess is formed by the body portion, the first extending portion and the second extending portion.

3. The portable communication device of claim 2, wherein a first rail of the two first guide rails is formed in the first extending portion, and wherein a first structure of the first guide structures protrudes toward the first rail of the two first guide rails, such that an ending portion of the first structure is accommodated in the first rail and configured to slide therealong.

4. The portable communication device of claim 2, wherein a second rail of the two first guide rails is formed in the second extending portion, and wherein a second structure of the two first guide structures protrudes toward the second rail of the two first guide rails, such that an ending portion of the second structure is accommodated in the second rail and configured to slide therealong.

5. The portable communication device of claim 4, wherein a third rail of the two second guide rails is formed in a first side surface of the second rotary structure facing the first extending portion, and wherein a third structure of the two second guide structures protrudes toward the third rail, such that an ending portion of the third structure is accommodated in the third rail and configured to slide therealong.

6. The portable communication device of claim 5, wherein a fourth rail of the two second guide rails is formed in a second side surface of the second rotary structure facing the second extending portion, and wherein a fourth structure of the two second guide structures protrudes toward the fourth rail, such that an ending portion of the fourth structure is accommodated in the fourth rail and configured to slide therealong.

7. The portable communication device of claim 1, wherein at least one of the two first guide rails of the first rotary structure or the two second guide rails of the second rotary structure is formed in a substantially arc shape.

8. The portable communication device of claim 1, wherein when the housing is folded, the first rotary structure is spaced apart from the second rotary structure.

9. The portable communication device of claim 1, wherein the first rotary structure is configured to rotate independently from the second rotary structure.

10. The portable communication device of claim 1, wherein the first rotary structure is operatively coupled to the second rotary structure in absence of a gear disposed therebetween.

11. The portable communication device of claim 1, wherein the housing includes a hinge housing portion disposed in at least one portion of the first housing portion and at least one portion of the second housing portion, and wherein at least one portion of the first hinge module is accommodated in the hinge housing portion.

12. The portable communication device of claim 1, wherein each of the first axis and the second axis is a virtual axis.

13. The portable communication device of claim 1, further comprising:
    a second hinge module accommodated in the housing, the second hinge module including:
    a third rotary structure corresponding to the first housing portion;
    a fourth rotary structure corresponding to the second housing portion;
    a first gear connected to the third rotary structure and configured to rotate about a third axis; and
    a second gear connected to the fourth rotary structure and configured to rotate about a fourth axis.

14. The portable communication device of claim 13, wherein the second hinge module further includes a third gear and a fourth gear disposed between the first gear and the second gear so as to mechanically couple the first gear and the second gear.

15. A portable communication device, comprising:
a housing including a first housing portion and a second housing portion, the first housing portion configured to rotate about a first rotating axis parallel to an axial direction, and the second housing portion configured to rotate about a second rotating axis parallel to the axial direction;
a display accommodated in the first housing portion and the second housing portion, the display including a folding area deformable to be flat or curved, so that the portable communication device is selectively disposable into an unfolded state in which the folding area is substantially flat, and a folded state in which the first housing portion and the second housing portion at least partially contact each other;
a first hinge module disposed in the housing and connected to the first housing portion and the second housing portion, the first hinge module configured to couple the first housing portion and the second housing portion such that the first housing portion and the second housing portion rotate in opposite directions, wherein the first hinge module includes a first shaft configured to rotate in response to rotation of the first housing portion, a second shaft configured to rotate in response to rotation of the second housing portion; and
a second hinge module disposed in the housing and configured to guide a rotational path of the first housing portion and a rotational path of the second housing portion,
wherein the second hinge module includes:
a fixed structure including a first sidewall, a second sidewall configured to face the first sidewall in the axial direction, a third sidewall disposed between the first sidewall and the second sidewall, and a fourth sidewall disposed between the first sidewall and the second sidewall and configured to face the third sidewall in the axial direction, wherein each of the first sidewall and the second sidewall includes two first guide structures, and each of the third sidewall and the fourth sidewall includes two second guide structures;
a first rotary structure including a body connected to the first housing portion (21), a first extending portion extending from the body into a space between the first sidewall and the third sidewall, and a second extending portion extending from the body into a space between the second sidewall and the fourth sidewall, wherein each of the first extending portion and the second extending portion includes two first guide rails, a first structure of the two first guide structures included in the first sidewall is at least partially accommodated in a first rail of the two first guide rails included in the first extending portion, and a second structure of the two first guide structures included in the second sidewall is at least partially accommodated in a second rail of the two first guide rails included in the second extending portion; and
a second rotary structure connected to the second housing portion and at least partially disposed between the third sidewall and the fourth sidewall, the second rotary structure including two second guide rails in which the two second guide structures are at least partially accommodated,
wherein in the unfolded state, at least a part of the second rotary structure is located between the first extending portion and the second extending portion, and wherein in the folded state, an air gap is formed between the first extending portion and the second extending portion.

16. The portable communication device of claim 15, wherein the two first guide rails include a first end portion disposed adjacent to the second housing portion in the unfolded state, and a second end portion disposed adjacent to the first housing portion in the unfolded state,
wherein the two second guide rails include a third end portion disposed adjacent to the first housing portion in the unfolded state, and a fourth end portion disposed adjacent to the second housing portion in the unfolded state, and
wherein in the unfolded state, the first end portion of the two first guide rails is disposed closer to the second housing portion than the third end portion of the two second guide rails.

17. The portable communication device of claim 16, wherein in the folded state, the first end portion of the two first guide rails and the third end portion of the two second guide rails are disposed in an open form extending toward the folding area.

18. The portable communication device of claim 16, wherein the two first guide rails are formed to include a circular arc shape whose center is the first rotating axis, and the first end portion and the second end portion are spaced apart from each other along a circumferential direction of the first rotating axis by a first angle,
wherein the two first guide structures extend at a second angle smaller the first angle along the circumferential direction of the first rotating axis,
wherein the two second guide rails are formed to include a circular arc shape whose center is the second rotating axis, and the third end portion and the fourth end portion are spaced apart from each other along a circumferential direction of the second rotating axis by a third angle, and
wherein the two second guide structures extend at a fourth angle smaller the third angle along the circumferential direction of the second rotating axis.

19. The portable communication device of claim 16, wherein when the portable communication device is disposed in the folded state, an air gap is formed between the first end portion of the two first guide rails and the two first guide structures, or between the third end portion of the two second guide rails and the two second guide structures, and
wherein when the portable communication device is disposed in the unfolded state, the two first guide structures extend through the first end portion, or through the third end portion.

20. The portable communication device of claim 15, wherein in the unfolded state, at least a part of the second rotary structure is disposed so as to be surrounded by the first extending portion, the second extending portion, and the body.

21. The portable communication device of claim 15, wherein the fixed structure includes a first area having a first through-hole and a second area having a second through-hole, the second area being spaced apart from the first area in the axial direction, and
wherein each of the first rotary structure and the second rotary structure is disposed between the first area and the second area, when viewed in the axial direction.

22. The portable communication device of claim 15, further comprising a sub-gear includes two sub-gears, and wherein each of the two sub-gears is engaged with a first gear included in the first shaft and a second gear included in the second shaft.

23. The portable communication device of claim 15, wherein the first rotary structure is assembled onto the fixed structure by rotating the two first guide structures in an unfolding direction while the two first guide structure contact with a first end portion of the two first guide rail, and wherein the second rotary structure is assembled onto the fixed structure by rotating the two second guide structure in the unfolding direction while the two second guide structure contact with a third end portion of the two second guide rail.

24. The portable communication device of claim 15, wherein the two first guide rails included in the first extending portion each include a first portion and a second portion protruding from the first extending portion toward the first sidewall, wherein the two first guide structures included in the first sidewall is at least partially located between the first portion and the second portion when viewed in a radial direction of the first rotating axis, wherein the two first guide rails included in the second extending portion is defined by a third portion and a fourth portion protruding from the second extending portion toward the second sidewall, and wherein the two first guide structures included in the second sidewall are at least partially located between the third portion and the fourth portion when viewed in the radial direction of the first rotating axis.

25. The portable communication device of claim 15, wherein the second rotary structure includes a first portion and a second portion protruding toward the third sidewall, and a third portion and a fourth portion protruding toward the fourth sidewall, wherein the two second guide rails are defined between the first portion and the second portion and between the third portion and the fourth portion, wherein the two second guide structures included in the third sidewall are at least partially located between the first portion and the second portion when viewed in a radial direction of the second rotating axis, and wherein the two second guide structures included in the fourth sidewall are at least partially located between the third portion and the fourth portion when viewed in the radial direction of the second rotating axis.

* * * * *